_(12)_ United States Patent
Teng et al.

(10) Patent No.: US 11,575,881 B2
(45) Date of Patent: Feb. 7, 2023

(54) NEAR-EYE DISPLAY MODULE RELEASING THE EYE'S FOCUS FROM FIXED PLANE

(71) Applicant: SUN YAT-SEN UNIVERSITY, Guangdong (CN)

(72) Inventors: Dongdong Teng, Guangdong (CN); Lilin Liu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 17/535,713

(22) Filed: Nov. 26, 2021

(65) Prior Publication Data

US 2022/0166966 A1 May 26, 2022

(30) Foreign Application Priority Data

Nov. 26, 2020 (CN) .......................... 202011356824.4

(51) Int. Cl.
*H04N 13/332* (2018.01)
*G02B 27/01* (2006.01)
*G02B 30/33* (2020.01)
*H04N 13/385* (2018.01)

(52) U.S. Cl.
CPC ....... *H04N 13/332* (2018.05); *G02B 27/0101* (2013.01); *G02B 27/0172* (2013.01); *G02B 30/33* (2020.01); *H04N 13/385* (2018.05); *G02B 2027/0134* (2013.01); *G02B 2027/0178* (2013.01)

(58) Field of Classification Search
CPC .. H04N 13/332; H04N 13/385; H04N 13/344; G02B 27/0101; G02B 27/0172; G02B 27/0176; G02B 30/33; G02B 2027/0134; G02B 2027/0178
See application file for complete search history.

(56) References Cited

U.S. PATENT DOCUMENTS

| | | | |
|---|---|---|---|
| 10,652,526 B2 | 5/2020 | Liu et al. | |
| 2004/0184145 A1* | 9/2004 | Fridman | ................ G02B 30/27 |
| | | | 348/E13.043 |
| 2017/0270637 A1* | 9/2017 | Perreault | ............ H04N 5/23232 |
| 2017/0310954 A1* | 10/2017 | Liu | ....................... H04N 13/398 |
| 2021/0314553 A1 | 10/2021 | Teng et al. | |

OTHER PUBLICATIONS

Dongdong Teng, et al., "Three-Dimensional Display Method for Large Field of View and Small Viewing-Zone Interval", Unpublished U.S. Appl. No. 17/107,964, filed Dec. 1, 2020.

* cited by examiner

*Primary Examiner* — Brent D Castiaux
(74) *Attorney, Agent, or Firm* — JCIPRNET

(57) ABSTRACT

The invention discloses a near-eye display module which includes at least one projection module, a bracing structure, and a control unit, releasing the eye's focus from a fixed plane. A projection module consists of more than one projection units, and the bracing structure functions as a holder for these projection units. A projection unit includes a display panel, a converging device which converges the light beams incident onto or outgoing from the display panel, and a deflection aperture which deflects the light coming from the converging device. The viewer wears two such near-eye display modules as eye-glasses. In the near-eye display module corresponding to an eye, the projection units of a same projection module jointly project at least one whole image to this eye, for VAC-free (Convergence-Accommodation conflict-free) three dimensional (3D) display based on Maxwellian view or multiple-images-one-eye.

23 Claims, 19 Drawing Sheets

NEAR-EYE DISPLAY MODULE RELEASING THE EYE'S FOCUS FROM FIXED PLANE

CROSS REFERENCE TO RELATED APPLICATION

This application claims the priority benefit of China application serial no. 202011356824.4 filed Nov. 26, 2020. The entirety of the above-mentioned patent application is hereby incorporated by reference herein and made a part of the specification.

TECHNICAL FIELD

The present invention relates to the technical field of three-dimensional (3D) display, and more specifically, to a near-eye display module that relieves the vergence-accommodation conflict (VAC) problem.

BACKGROUND

As a potential new-generation mobile terminal platform, VR/AR has good application foreground. Most existing VR/AR systems present 3D scenes based on traditional stereoscopic technology. Through two eyepieces, two two-dimensional images are projected to the viewer's two eyes respectively, thus activating the viewer's depth perception by binocular parallax. In this process, each eye of the viewer needs to focus on the corresponding display panel or its image for clearly observing the corresponding two-dimensional image. Therefore, the inconsistency between the fixed focusing depth (i.e. the depth of the display panel or its image) of each eye and the binocular convergent depth (i.e. the depth of the displayed 3D scene) exists, which is often called vergence-accommodation conflict (VAC). This VAC conflict results in visual discomfort, which becomes heavier in the near-eye display. In fact, the VAC conflict has been the bottleneck problem hindering the promotion and application of 3D display.

At present, along different technical routes, researchers are working hard to alleviate or eventually push away the VAC problem. Maxwellian view and multiple-images-one-eye are two possible technical routes for VAC-free near-eye display. The former takes small apertures as the viewing windows for each eye of the viewer. The small size of the apertures reduces the intensity distribution gradient of the perceived light beams from the display panel along the depth direction, thus releasing the focus from the pixels on the display panel or their images. Driven by binocular convergence, the viewer's focus is dragged to the displayed 3D scene, resulting in VAC-free display. In the multiple-images-one-eye technical route, more than one image is projected into each eye through different segments of this eye's pupil. The light beams projected by these images superimpose into focusable 3D scene.

SUMMARY OF THE INVENTION

The purpose of the present invention is to design a near-eye display module that releases the focus of the eye from a fixed panel. A deflection aperture of small size is taken as the viewing window of a display panel, to constrain the divergence angle of perceived light beams emitting from this display panel, so as to release the eye's focus from the display panel's image; multiple apertures for multiple display panels are arranged for an eye to solve the field of view (FOV) limitation problem caused by the small size of an aperture. Through these deflection apertures, at least one image with a large FOV of the target 3D scene is guided into the corresponding eye. Two such near-eye display modules for two eyes of a viewer construct a 3D display system for VAC-free display based on Maxwellian view technology or multiple-images-one-eye technology.

The present invention provides a near-eye display module releasing the eye's focus from a fixed plane, which includes:

at least one projection module, which is constructed by a plurality of separated distributed projection units, wherein each of the projection units comprises a display panel a converging device, and a deflection aperture in a mutual corresponding relationship;

wherein, the display panel comprises a plurality of pixels for optical information display, the converging device converges a light incident onto or outgoing from the corresponding display panel, and the deflection aperture deflects the incident light from corresponding converging device;

a bracing structure, to hold the display panels, the converging devices and the deflection apertures of the at least one projection module;

a control unit, which is with signal connection to the display panels and refreshes display panels with optical information, wherein, a loading information of each pixel is the projection message of the 3D scene to be displayed, along the line connecting the corresponding deflection aperture with the pixel's image on the corresponding deflection aperture, or along the line connecting the corresponding deflection aperture with the pixel's image on the corresponding converging device and the corresponding deflection aperture;

the near-eye display module is designed such that a bracing structure holding deflection apertures is placed near to an eye of the viewer as an eyepiece, with the vertical projection of each deflection aperture on the plane perpendicular to the eye's viewing direction being less than 2.5 mm along all directions;

and, all the display panels' images on the corresponding deflection aperture, or on the corresponding converging device and the corresponding deflection aperture, of a same projection module jointly cover the field of view of the 3D scene to be displayed, and at least a whole image with the field of view is projected into the pupil of the eye.

Furthermore, the converging device of each projection unit is a lens, or a phase element with lens function.

Furthermore, the converging device of a projection unit is a microstructure array, whose microstructure elements correspond to the pixels of the corresponding display panel by a one-to-one manner, with each microstructure element guiding a light beam incident onto or outgoing from the corresponding pixel to the deflection aperture of the projection unit.

Furthermore, the display panels are back-lit display panels, and a projection unit comprises a backlight module for providing backlight.

Furthermore, the backlight module of each projection unit is an optical waveguide structure.

Furthermore, the deflection aperture of a projection unit is replaced by K sub-deflection apertures;

and, the backlight module of a projection unit projects K backlights sequentially at K time-points of a time period, with the K backlights converging to K sub-deflection apertures of the projection unit, respectively, through modulation of the converging device;

wherein, at a time-point, the corresponding sub-deflection aperture of each pixel is the sub-deflection aperture to which the light beam from the pixel converges at the time-point, and the loading information of each pixel is the projection message of the 3D scene to be displayed along the line connecting the corresponding sub-deflection aperture with the pixel's image on the corresponding sub-deflection aperture, or along the line connecting the corresponding sub-deflection aperture with the pixel's image on the corresponding sub-deflection aperture and the corresponding converging device; wherein K≥2.

Furthermore, each sub-deflection aperture allows incident light to be deflected through only at the time-points when the corresponding backlight is projected.

Furthermore, each pixel of the display panel is composed of L sub-pixels which emit light of L different primary colors, respectively, and each deflection aperture is replaced by L sub-deflection apertures;

and, the backlight module of a projection unit projects L backlights of the L primary colors, with the L backlights being guided to L sub-deflection apertures of the projection unit in a one-to-one manner;

wherein, the corresponding sub-deflection aperture of a sub-pixel is the sub-deflection aperture to which the light from the sub-pixel converges, and the loading information of a sub-pixel is the projection message with the corresponding primary color of the 3D scene to be displayed along the line connecting the corresponding sub-deflection aperture with the sub-pixel's image on corresponding sub-deflection aperture, or along the line connecting the corresponding sub-deflection aperture with the sub-pixel's image on the corresponding converging device and the corresponding deflection aperture; wherein L≥2.

Furthermore, for each sub-deflection aperture, its emission ratio to light of a corresponding primary color is at least 9 times of that to light of non-corresponding primary colors.

Furthermore, deflection apertures of adjacent projection units are respectively designed with different orthogonal characteristics, and for each deflection aperture, its emission ratio to light of a corresponding orthogonal characteristic from the corresponding display panel is at least 9 times of that to light of non-corresponding orthogonal characteristics.

Furthermore, the orthogonal characteristics are timing characteristics which respectively allow incident light to be deflected through at different time-points of a time period, or linear-polarization characteristics which respectively allow lights of mutual perpendicular polarization directions to be deflected through, or rotational-polarization characteristics which respectively allowing left-handed light or right-handed light to be deflected through, or a combination thereof.

Furthermore, the control unit is with signal connection to the deflection apertures for controlling the deflection apertures to be turned on or turned off.

Furthermore, the sub-deflection apertures corresponding to adjacent projection units are endowed with different orthogonal characteristics, and for each sub-deflection aperture, an emission ratio to light of a corresponding orthogonal characteristic from the corresponding display panel is at least 9 times of that to light of non-corresponding orthogonal characteristics.

Furthermore, the control unit is with signal connection to the sub-deflection apertures for controlling the sub-deflection apertures to be turned on or turned off.

Furthermore, the sub-deflection apertures corresponding to adjacent projection units are endowed with different orthogonal characteristics, and for each sub-deflection aperture, an emission ratio to light of a corresponding orthogonal characteristic is at least 9 times of that to light of non-corresponding orthogonal characteristics.

Furthermore, the control unit is with signal connection to the sub-deflection apertures for controlling the sub-deflection apertures to be turned on and turned off.

Furthermore, a deflection aperture is replaced by N sub-deflection apertures, and the pixels or sub-pixels of a corresponding display panel are divided into N groups, which converge to the N sub-deflection apertures respectively through the converging device;

wherein, the loading information of each pixel or each sub-pixel is the projection message of the 3D scene to be displayed, along the line connecting the corresponding deflection aperture with the pixel's or the sub-pixel's image on the corresponding deflection aperture, or along the line connecting the corresponding deflection aperture with the pixel's or the sub-pixel's image on the corresponding converging device and the corresponding deflection aperture; wherein N≥2.

Furthermore, a deflection aperture is replaced by N≥2 sub-deflection apertures of different orthogonal characteristics, with an emission ratio of a sub-deflection aperture to light of the corresponding orthogonal characteristic being at least 9 times of that to light of non-corresponding orthogonal characteristics, and the pixels or sub-pixels of a corresponding display panel are divided into N groups, which project light of the N kinds of orthogonal characteristics respectively;

wherein, the loading information of each pixel or each sub-pixel is the projection message of the 3D scene to be displayed, along the line connecting the corresponding deflection aperture with the pixel's or the sub-pixel's image on the corresponding deflection aperture, or along the line connecting the corresponding deflection aperture with the pixel's or the sub-pixel's image on the corresponding converging device and the corresponding deflection aperture.

Furthermore, the display panel-converging device pairs are discretely distributed around the bracing structure.

Furthermore, the bracing structure is with an eyeglass appearance.

Furthermore, multiple groups of deflection apertures are designed for the at least one projection module, and a pupil-tracking unit is employed for positioning the corresponding pupil;

wherein, one group of deflection apertures are activated as the effective deflection apertures according to the pupil's position, with the remaining groups being passivated.

Furthermore, when the deflection apertures are endowed with different orthogonal characteristics, the optional offset distances $\Delta s$ between different deflection-aperture groups along an arrangement path are set to be $\Delta = I_1 H \Delta d/(H+J)$ at $H<GI$ and $I_1<(H+J)$ or $\Delta = I2H\Delta d/(H+J)$ at $H=GI$, with $\Delta d$ denoting the interval between adjacent deflection apertures of a same group along the arrangement path;

wherein, H, G, $I_1$, and $I_2$ all are positive integers, J takes a positive integer which must make $H/(H+J)$ be a reduced fraction, and I is a deflection-aperture number of a basic periodic structure unit of a deflection-aperture group along the arrangement path, and a basic periodic structure unit is set according to the arrangement rule of the deflection apertures under the premise that only non-switchable orthogonal characteristics are considered, with non-switchable orthogonal characteristics being defined as the characteristics that different states cannot be endowed to a same deflection aperture in a switchable manner.

Furthermore, multiple groups of sub-deflection apertures are designed for the at least one projection module, and a pupil-tracking unit is employed for positioning the corresponding pupil;

wherein, one group of sub-deflection apertures are activated as the effective sub-deflection apertures according to the pupil's position, with the remaining groups being passivated.

Furthermore, the optional offset distances $\Delta$s between sub-deflection-aperture groups along an arrangement path are set to be $\Delta = I_1 H \Delta d/(H+J)$ at $H < GI$ and $I_1 < (H+J)$ or $\Delta = I_2 H \Delta d/(H+J)$ at $H = GI$, with $\Delta d$ denoting the interval between adjacent sub-deflection apertures of a same group along this arrangement path;

wherein, H, G, $I_1$, and $I_2$ all are positive integers, J takes a positive integer which must make $H/(H+J)$ be a reduced fraction, and I is a sub-deflection-aperture number of a basic periodic structure unit of a sub-deflection-aperture group along the arrangement path, and a basic periodic structure unit is set according to the arrangement rule of the sub-deflection apertures under the premise that only non-switchable orthogonal characteristics are considered, with non-switchable orthogonal characteristics being defined as the characteristics that different states cannot be endowed to a same sub-deflection aperture in a switchable manner.

The present invention designs a near-eye display module releasing the eye's focus from a fixed plane. Separated distributed projection units work together for a VAC-free display with a large FOV. The discrepancy between facing orientations of different deflection apertures effectively reduces crosstalk noise between different projection units. At the same time, in a projection unit, a converging device converges the light from the corresponding display panel to a zone around the corresponding deflection aperture can also reduce this kind of crosstalk noise. Additionally, the introduction of different orthogonal characteristics to different deflection apertures or sub-deflection apertures suppresses the crosstalk noise furthermore. Employing the display module proposed in the present invention, VAC-free 3D display with low noise and large FOV is expectable.

DETAILED DESCRIPTION

Figure 1:
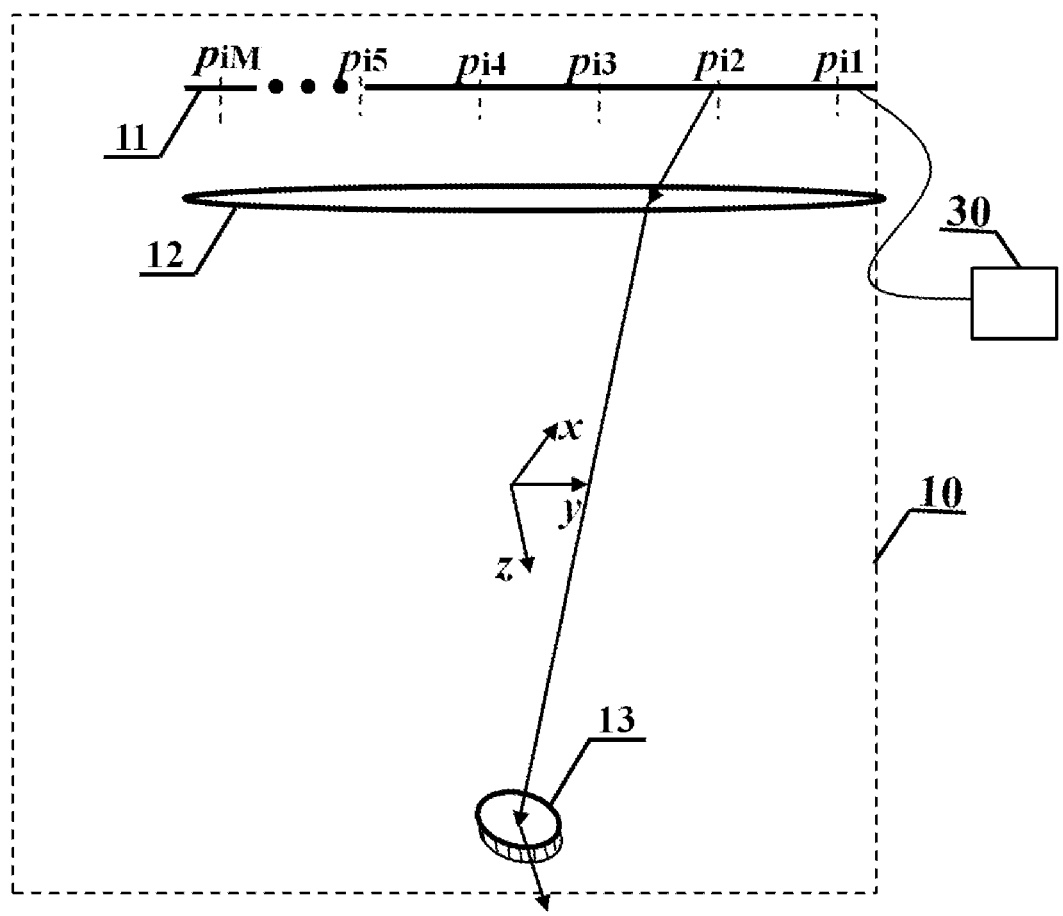
FIG. 1 is the optical structure of a projection unit with a lens serving as the converging device.

The accompanying drawings are only for illustrative purposes and cannot be understood as a limitation of this patent. In order to better illustrate the embodiments, some parts of the accompanying drawings may be omitted, enlarged or reduced, and do not represent the size of an actual product. For technical staff in the 3D display field, it is understandable that some well-known structures, repetitive structures and descriptions thereof in the drawings may be omitted. The present invention designs a projection unit, whose converging device converges light from its corresponding display panel to its corresponding small-size deflection aperture. A projection unit guides an image with a small FOV to the viewer's eye. Multiple such projection units construct a projection module, which project a large FOV image spliced up by such small FOV images to the corresponding eye. Thus, an image of large FOV and light beams of small divergence angle are guided to the eye for implementing VAC-free Maxwellian view display. Furthermore, designing multiple projection modules for an eye, or replacing a deflection aperture by sub-deflection apertures with orthogonal characteristics, VAC-free multiple-images-one-eye can get realized. The near-eye display module of present invention is designed to release the eye's focus from a fixed plane by separated distributed projection units. The discrepancy between facing orientations of different deflection apertures effectively reduces crosstalk noise between different projection units. At the same time, in each projection unit, the converging device converges the light from the corresponding display panel to the corresponding deflection aperture, so as to reduce this kind of crosstalk noise. Additionally, the introduction of orthogonal characteristics to the deflection apertures or sub-deflection apertures can also suppress the crosstalk noise. An optical structure with two such display modules serving as two eyepieces can function as an optical display system for head-mounted VR, AR, etc. The technical solution of the present invention will be further described below in conjunction with the drawings and embodiments.

Embodiment

Figure 2:
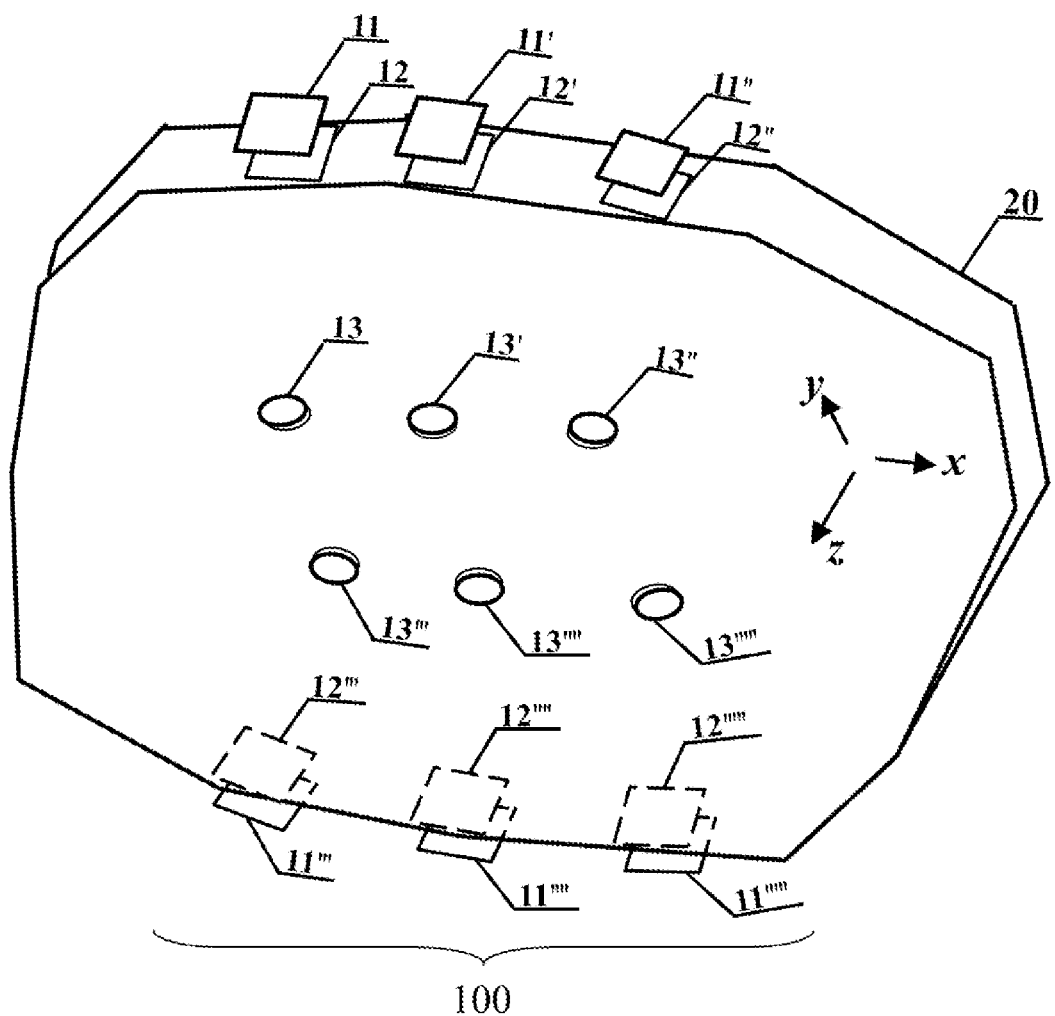
FIG. 2 shows the schematic diagram of a projection module.
Figure 3:
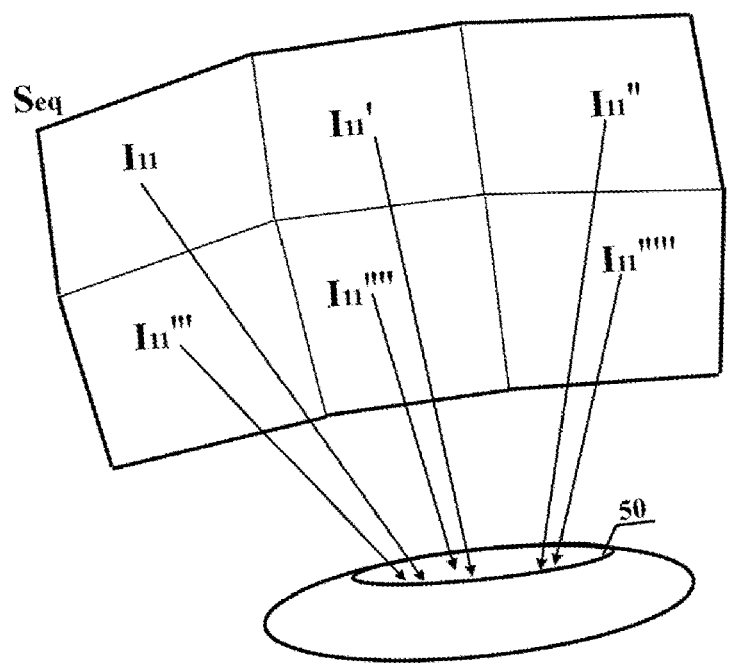
FIG. 3 shows an equivalent display screen projected by a projection module.

The optical structure of a projection unit 10 is shown in FIG. 1, which includes a display panel 11, a converging device 12, and a deflection aperture 13. In FIG. 1, the display panel 11 takes a self-luminous display panel as an example; a lens is used as the converging device 12, and the deflection aperture 13 takes a reflecting surface as an example. The components of a same projection unit 10 are mutually corresponding in a one-to-one manner. Among them, the display panel 11 is composed of pixels for optical information loading, such as $p_{i1}$, $p_{i2}$, $p_{i3}$, $p_{i4}$, ..., $p_{iM}$ in the FIG. 1. A pixel is often consisted of sub-pixels emitting light of different primary colors. A converging device 12 converges light from the corresponding display panel 11 to the corresponding deflection aperture 13. The deflection aperture 13 guides incident convergent light to the viewer's eye 50. Separated distributed multiple projection units are braced by a bracing structure 20, forming a projection module 100, as shown in FIG. 2. The bracing structure 20 in FIG. 2 takes an eyeglass shape. M=6 projection units construct the projection module 100 in FIG. 2. Concretely, a projection unit 10 consists of the display panel 11, the converging device 12, and the deflection aperture 13; a projection unit 10' consists of the display panel 11', the converging device 12', and the deflection aperture 13'; a projection unit 10" consists of the display panel 11", the converging device 12", and the deflection aperture 13"; a projection unit 10''' consists of the display panel 11''', the converging device 12''', and the deflection aperture 13'''; a projection unit 10'''' consists of the display panel 11'''', the converging device 12'''', and the deflection aperture 13''''; a projection unit 10''''' consists of the display panel 11''''', the converging device 12''''', and the deflection aperture 13'''''. The deflection aperture of each projection unit is embedded in the eyeglass-shape bracing structure 20. An image of a projection unit's display panel is formed by the corresponding converging device and the corresponding deflection aperture. As shown in FIG. 3, $I_{11}$ is the image of the display panel 11, $I_{11'}$ is the image of the display panel 11', and $I_{11}"$ is the display panel 11", $I_{11}'''$ is the image of the display panel 11''', $I_{11}''''$ is the image of the display panel 11'''', $I_{11}'''''$ is the image of the display panel 11'''''. The optical information projected by a projection unit is equivalent to that emitting from the image of its display panel and transmitting through a virtual hole where the corresponding deflection aperture locates. The images of M=6 display panels splice up an equivalent display screen $S_{eq}$. Equivalently, the optical image projected by the equivalent display screen are taken as that from a projection module. The light from the equivalent display screen propagates through the virtual holes corresponding to the M=6 deflection apertures 13, 13', 13", 13''', 13'''', 13'''''. With the eyeglass-shaped bracing structure 20 being adhered to an eye 50 of the viewer as an eye-piece, the equivalent display screen $S_{eq}$ of the projection module 100 projects light to the eye 50. More simply, it can be said the equivalent display screen $S_{eq}$ of a projection module 100 projects light to the eye 50 through the corresponding M deflection apertures in this patent. The equivalent display screen of a projection module 100 needs to cover the FOV of the 3D scene to be displayed. The spatial arrangement of the projection units in a projection module 100 needs to guarantee that the light from the equivalent display screen $S_{eq}$ is completely perceived by the corresponding eye 50. A control unit 30 is connected with the display panels to drive display panels to load optical information. The loaded information of each pixel is the projection message of the 3D scene to be displayed, along the line connecting the corresponding deflection aperture with the image of this pixel on the corresponding converging device and the corresponding deflection aperture. The vertical projection of each deflection aperture 13 on the plane perpendicular to the visual direction of the corresponding eye is designed to be smaller than 2.5 mm (half of the average diameter of the human pupil) in all directions. Thus, the light beam from each pixel received by the eye 50 is with a smaller divergence angle, which means a smaller light intensity gradient along the depth direction. The vertical projection of a deflection aperture on a plane described in this patent refers to the deflection aperture's projection on this plane along the direction perpendicular to this plane. So, when two projection modules similar to that shown in FIG. 2 are placed near to two eyes of a viewer as two eyepieces, a VAC-free 3D display can be realized by Maxwellian view technology. The equivalent display screens for different eyes can be arranged separated spatially, or intersected, even overlapped. When the spaces among deflection apertures are set transparent, the display module can function as the eyepiece of an AR system. If not, it can work as the eyepiece of a VR system.

In FIG. 2, the display panel-converging device pairs of different projection units are shown being placed on the upper edge and the lower edge of the eyeglass-shaped bracing structure 20. This arrangement is beneficial for reducing crosstalk noise between adjacent projection units. For example, due to the difference between facing orientations of corresponding deflection apertures, the light projected by display panel 11 of FIG. 2 will not reach to the deflecting surface of deflection aperture 13'''. Actually, the display panel-converging device pairs of different projection units also can be placed around the whole periphery of the eyeglass-shaped bracing structure 20. Of course, they also can be gathered on one edge of the eyeglass-shaped bracing structure 20.

Figure 4:
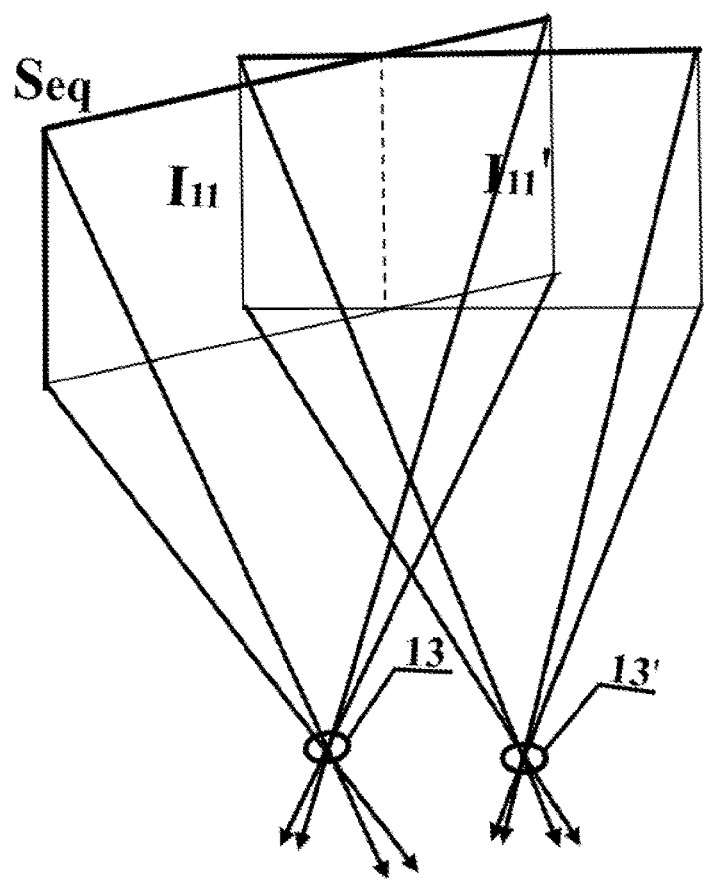
FIG. 4 shows intersected images of display panels from adjacent projection units of a same projection module.
Figure 5:
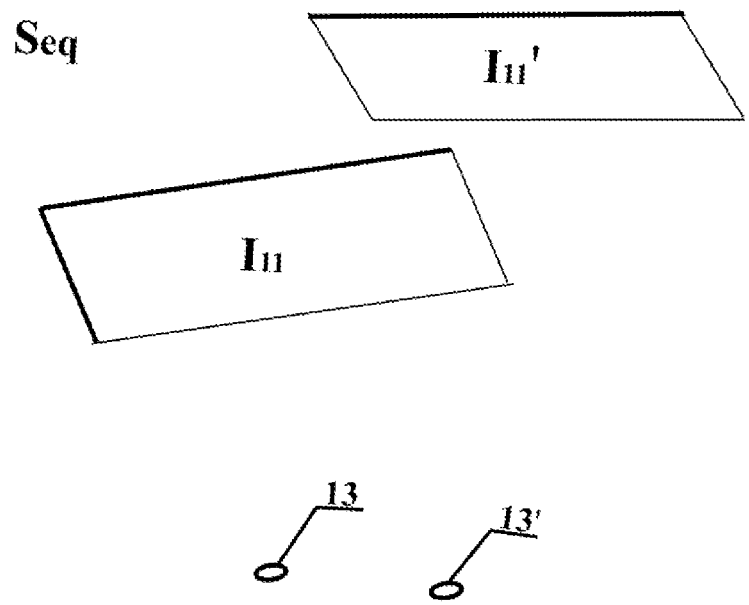
FIG. 5 shows non-intersected images of display panels from adjacent projection units of a same projection module.

In FIG. 3, the images of display panels from different projection units are spliced seamlessly to form an equivalent display screen $S_{eq}$. Actually, under the premise that the images of all display panels in a projection module can collectively and completely cover the FOV of the 3D scene to be displayed, the images of adjacent display panels can intersect mutually as shown in FIG. 4, or be non-intersecting as shown in FIG. 5.

Figure 6:
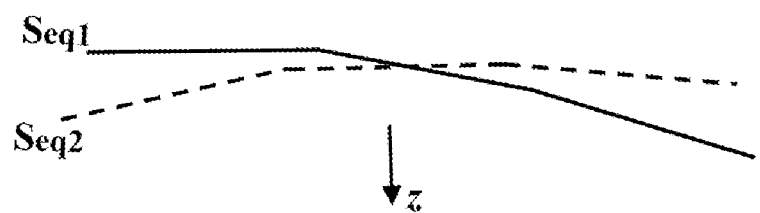
FIG. 6 shows two intersected equivalent display screens of two projection module.
Figure 7:
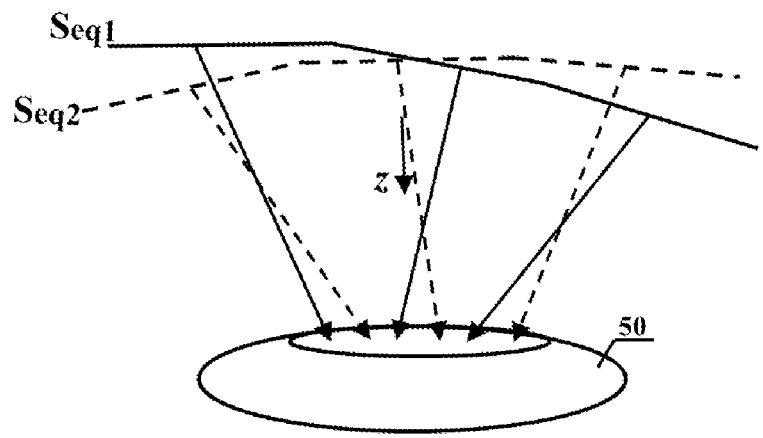
FIG. 7 shows the overlapped observing zones of intersected equivalent display screens.
Figure 8:
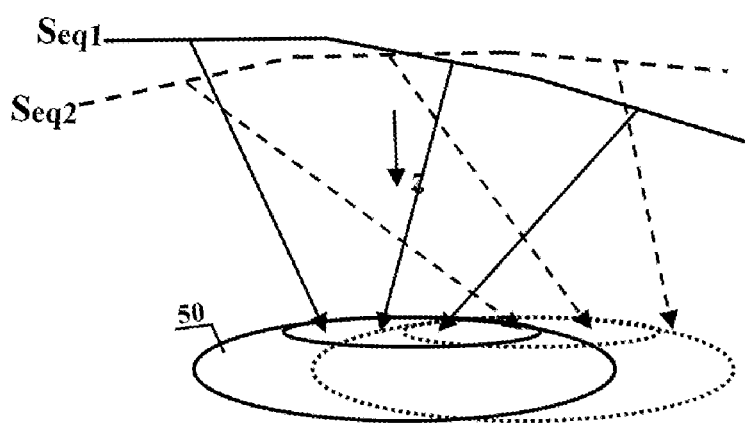
FIG. 8 shows relatively misplaced observing zones of intersected equivalent display screens.
Figure 9:
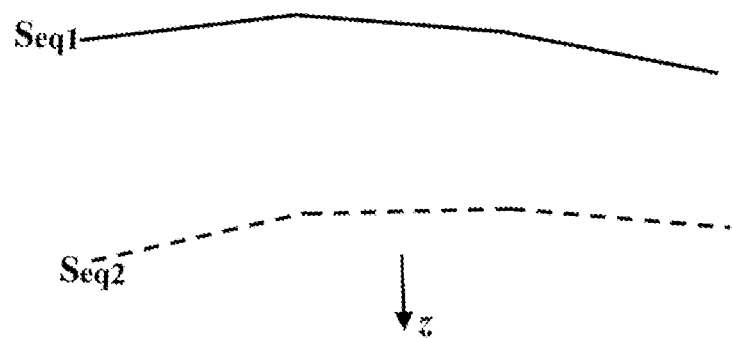
FIG. 9 shows non-intersected equivalent display screens.

In FIG. 2, only one projection module 100 is shown. The near-eye display module can be constructed by more than one projection modules. All projection units of different projection modules are braced by the common eyeglass-shaped bracing structure 20. The equivalent display screens from different projection modules all should be able to cover the FOV of the 3D scene to be displayed. FIG. 6 shows two intersected equivalent display screens $S_{eq1}$ and $S_{eq2}$ from two projection modules. The observing zones corresponding to these two equivalent display screens may overlap around the eye 50, so to implement VAC-free multiple-images-one-eye display, as shown in FIG. 7. They also can be arranged mutually misplaced, as shown in FIG. 8, with the premise that at least a whole image with its FOV covering the target 3D scene can be perceived by the eye 50. This whole image may come from a single equivalent display screen, or different segments of different equivalent display screens. In the case shown in FIG. 8, for the eyes 50 at a certain position, two display mechanisms of Maxwellian view and multiple-images-one-eye operate together, with each of them being responsible for partial FOV. In addition, the equivalent display screens from different projection modules can also be arranged to be separated along the depth direction, as shown in FIG. 9, respectively being responsible for partial 3D scene around different depths.

Figure 10:
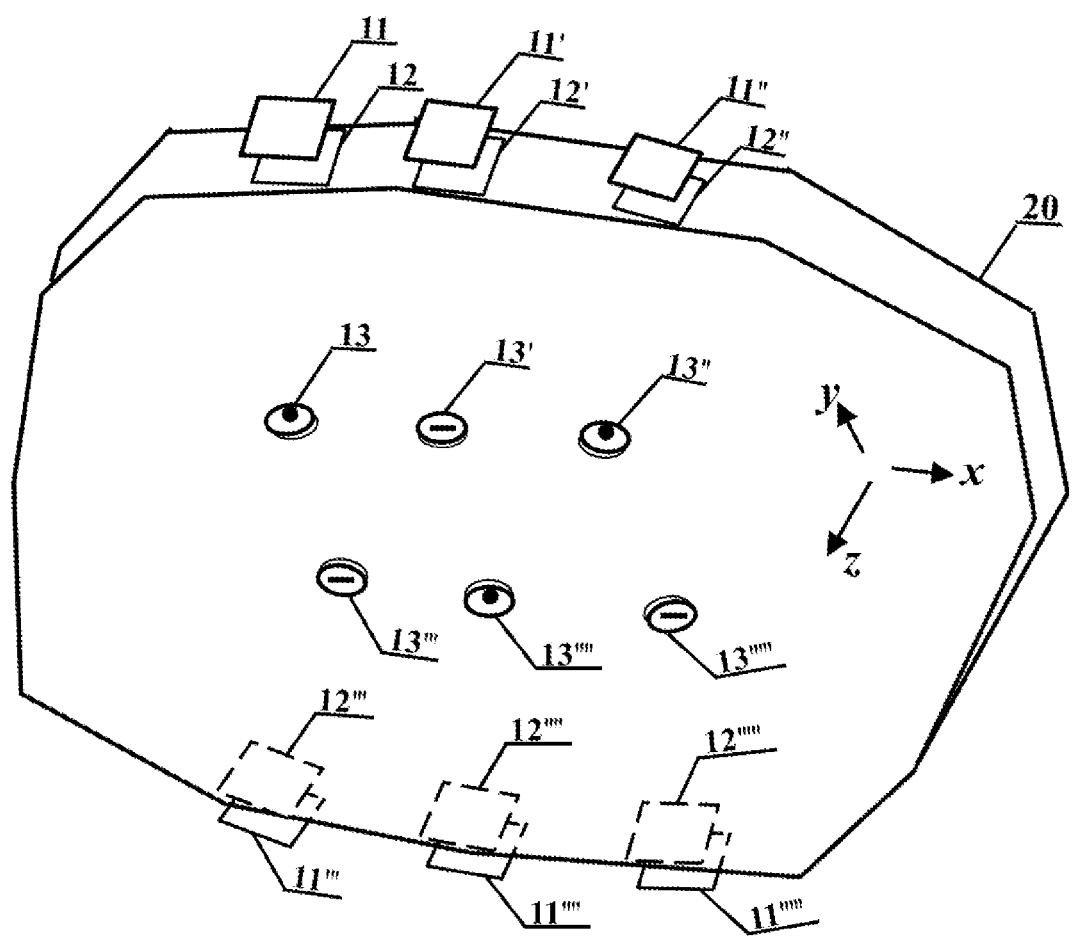
FIG. 10 is a projection module with deflection apertures of linear-polarization characteristics.

The discrete distribution of display panel-converging device pairs around the eyeglass-shaped bracing structure 20 is beneficial for suppressing crosstalk between projection units. Then, existing crosstalk between adjacent projection units can be suppressed further by endowing different orthogonal characteristics to adjacent deflection apertures. In FIG. 10, one projection module with linear-polarization characteristics are shown as an example. The light projected by display panel 11 partially enters the non-corresponding deflection aperture 13'. Linear-polarization characteristics are endowed to the deflection apertures. Concretely, taking deflection apertures 13 and 13' as examples, the endowed characteristics make the deflection aperture 13 only allow "•" light to be deflected through, while block incident "-" light. The deflection aperture 13' only allow "-" light to be deflected through, while block incident "•" light. Here, "•" and "-" denote two linear polarization states whose polarization directions are perpendicular to each other. Correspondingly, display panel 11 is designed to project "•" light only, and adjacent display panel 11' is designed to project "-" light only. Thus, crosstalk between projection units 10 and 10' gets removed effectively. Similarly, orthogonal characteristics are endowed to other deflection apertures and display panels, as shown in FIG. 10. Here, only "•" light or only "-" light being deflected through can be implemented by attaching a corresponding polarizer to each deflection aperture. The orthogonal characteristics also can be other exclusive characteristics, such as timing characteristics, i.e., deflecting incident light out at different time-points of a time period, or rotational-polarization characteristics, i.e., respectively allowing left-handed light or right-handed light to be deflected through, or a combination thereof. Taking timing characteristics as another example, $\Delta t$ denotes a time period. For the projection units shown in FIG. 10 with linear-polarization characteristics removed, at a time-point t within a time period $t \sim t+\Delta t$, only deflection apertures 13, 13", 13"" allow incident light being deflected through, and display panels 11, 11", 11"" get refreshed by corresponding optical information synchronously. At this time-point, display panels 11', 11''', 11''''' do not get refreshed by optical information and the deflection apertures 13', 13''', 13''''' block the incident light. At the time-point $t+\Delta t/2$, only deflection apertures 13', 13''', 13''''' allow incident light being deflected through, and the display panels 11', 11''', 11''''' get refreshed by corresponding optical information synchronously, while display panels 11, 11", 11"" display nothing and the deflection apertures 13, 13", 13"" block the incident light. Repeat this process in other time periods. Here, deflecting the incident light through or blocking the incident light at a time-point can be implemented by attaching a switchable liquid crystal aperture onto each deflection aperture, which is controlled by the control unit 30 with signal connection. In this patent, for each deflection aperture 13, its emission ratio to incident light with the corresponding orthogonal characteristic is designed 9 or more times of that to incident light with non-corresponding orthogonal characteristics. Under this condition, it is regarded that the light with non-corresponding orthogonal characteristics is blocked by a deflection aperture. Such blocking does not mean obligatory 100% blocking of the incident light with non-corresponding orthogonal characteristics. This fact also remains valid to sub-deflection apertures discussed in the following sections.

The deflection aperture 13 of a projection unit 10 can be replaced by N≥2 sub-deflection apertures with orthogonal characteristics different from each other, for projecting more than one display panel's image. Correspondingly, the pixels or sub-pixels of a display panel 11 should be divided into N pixel groups or N sub-pixel groups. In a projection unit, N groups of pixels or sub-pixels correspond to the N sub-deflection apertures in a one-to-one manner, with each pixel group or sub-pixel group only projecting light of orthogonal characteristic that can be deflected through by the corresponding sub-deflection aperture.

Figure 11:
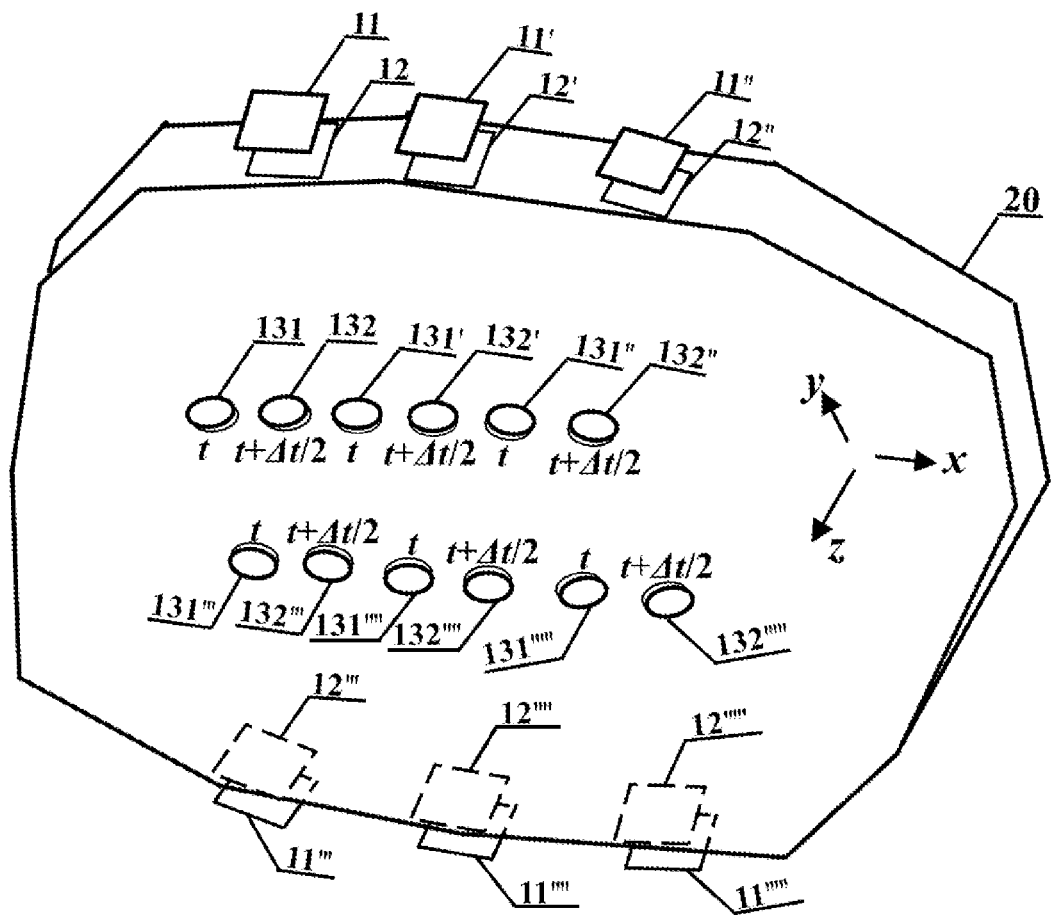
FIG. 11 shows a projection module with sub-deflection apertures of timing characteristics.

Taking N=2 as an example, a deflection aperture of each projection unit is replaced by N=2 sub-deflection apertures with different timing characteristics in FIG. 11. Concretely, sub-deflection apertures 131 and 132 replace the deflection aperture 13 of the projection unit 10; sub-deflection apertures 131' and 132' replace the deflection aperture 13' of the projection unit 10'; sub-deflection apertures 131" and 132" replace the deflection aperture 13" of the projection unit 10"; sub-deflection apertures 131''' and 132''' replace the deflection aperture 13''' of the projection unit 10'''; sub-deflection apertures 131'''' and 132'''' replace the deflection aperture 13'''' of the projection unit 10''''; sub-deflection apertures 131''''' and 132''''' replace the deflection aperture 13''''' of the projection unit 10'''''. At the time-point t of a time period $t \sim t+\Delta t$, only sub-deflection apertures 131, 131', 131", 131''', 131'''', 131''''' allow incident light to be deflected through, and the display panels 11, 11', 11", 11''', 11'''', 11''''' project light through sub-deflection apertures 131, 131', 131", 131''', 131'''', 131''''' respectively. Simultaneously, sub-deflection apertures 132, 132', 132", 132''', 132'''', 132''''' block the incident light at this time-point. At the time-point $t+\Delta t/2$ of the time period $t \sim t+\Delta t$, only sub-deflection apertures 132, 132', 132", 132''', 132'''', 132''''' allow incident light to be deflected through, and the display panels 11, 11', 11", 11''', 11'''', 11''''' project light through sub-deflection apertures 132, 132', 132", 132''', 132'''', 132''''' respectively. Simultaneously, sub-deflection apertures 131, 131', 131", 131''', 131'''', 131''''' block the incident light at this time-point. Repeat this process in other time periods. Here, allowing incident light to be deflected through or blocking the incident light by each sub-deflection aperture can be implemented by attaching a switchable liquid crystal aperture onto each sub-deflection aperture, which is controlled by the control unit 30 with signal connection. In this case, at different time-points of a time period, the sub-deflection apertures corresponding to a display panel are different. The loading information of a pixel is the projection message of the 3D scene to be displayed along the line connecting the corresponding sub-deflection aperture with the image of this pixel on the corresponding sub-deflection aperture, or along the line connecting the corresponding sub-deflection aperture with the image of this pixel on the corresponding converging device 12 and the sub-deflection aperture. FIG. 11 takes N=2 time-points as an example, and it also can take more time-points. In coordination with timing characteristics, the pixels of a display panel are divided into N pixel-groups in a time sequence. That is to say, each pixel group consists of all pixels of the corresponding display panel, but will only be activated at one corresponding time-point of the N time-points within a time period.

Figure 12:
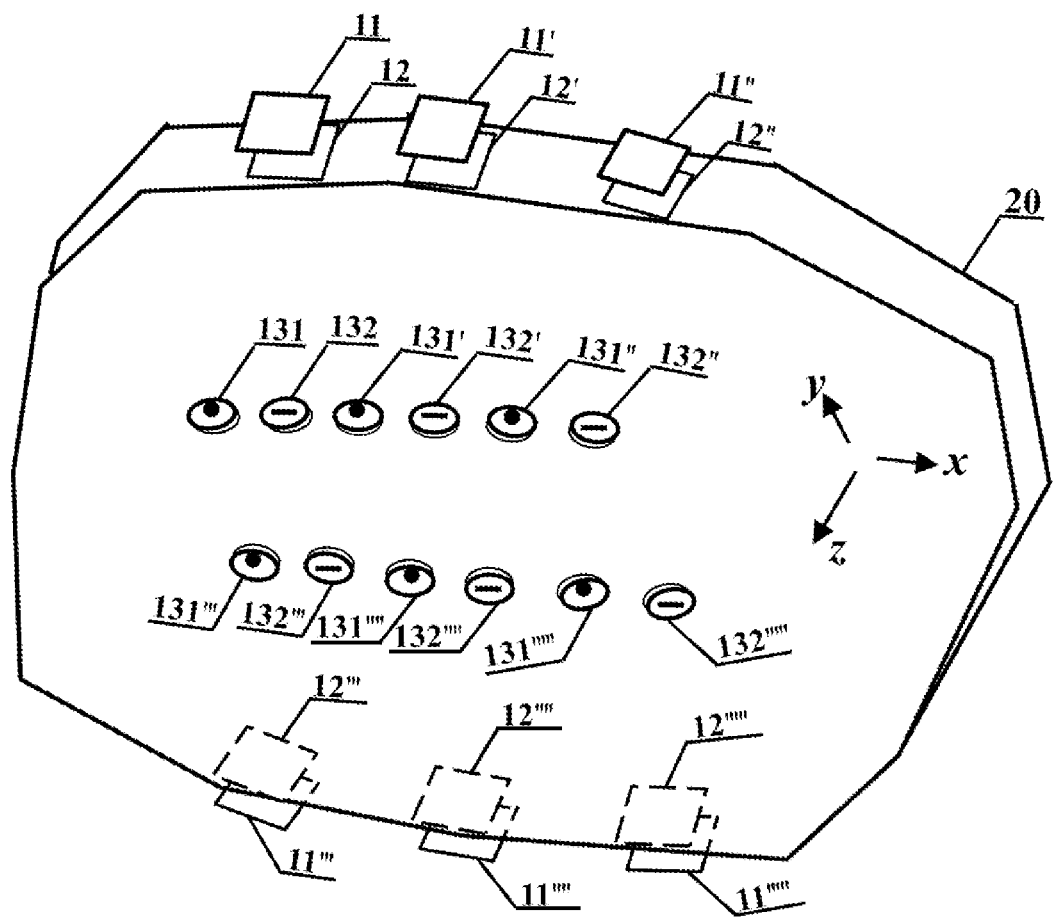
FIG. 12 is a projection module with sub-deflection apertures of linear-polarization characteristics.
Figure 13:
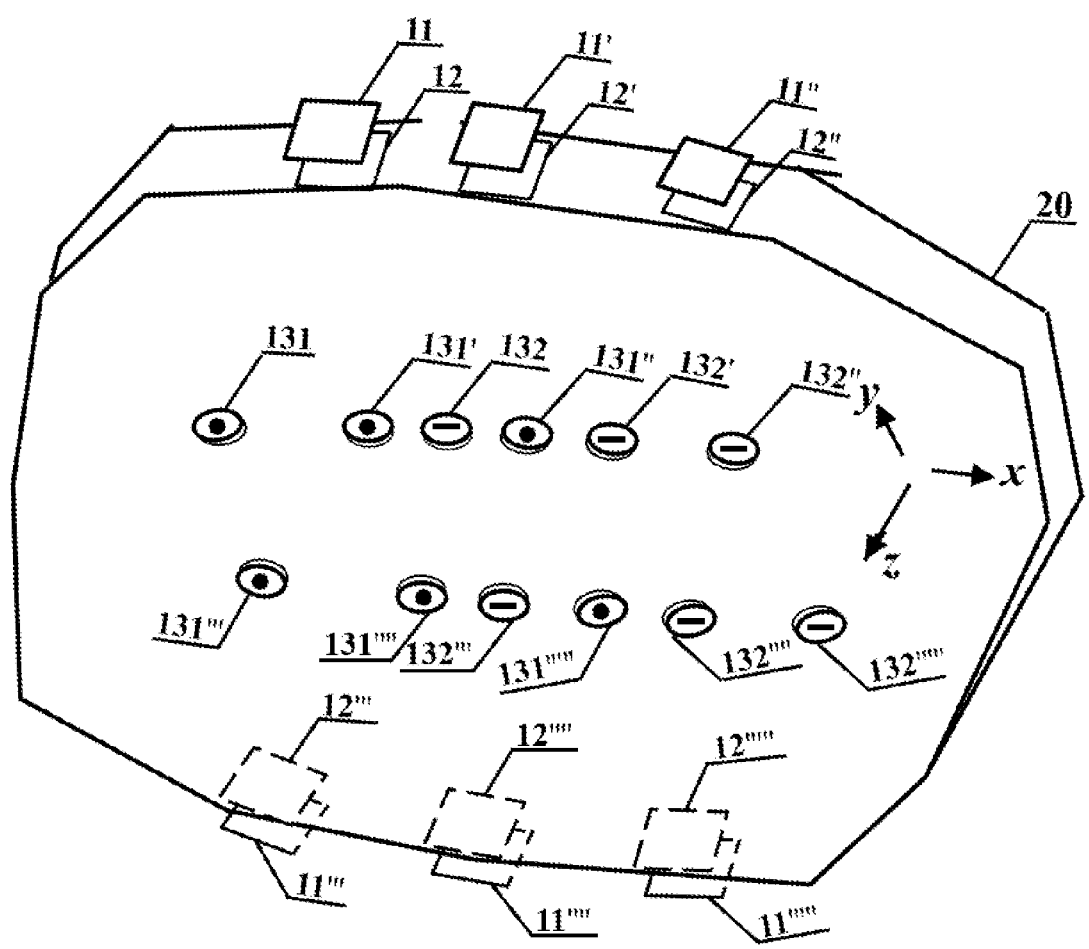
FIG. 13 shows a projection module with sub-deflection apertures of linear-polarization characteristics in another arrangement.

FIG. 12 takes two polarization directions perpendicular to each other as the orthogonal characteristics, and a deflection aperture of each projection unit is replaced by N=2 sub-deflection apertures, which allow only "-" light or only "•"

light to be deflected through, respectively. Concretely, sub-deflection apertures 131 and 132 replace the deflection aperture 13 of the projection unit 10, the sub-deflection apertures 131' and 132' replace the deflection aperture 13' of the projection unit 10', the sub-deflection apertures 131" and 132" replace the deflection aperture 13" of the projection unit 10", the sub-deflection apertures 131''' and 132''' replace the deflection aperture 13''' of the projection unit 10''', the sub-deflection apertures 131'''' and 132'''' replace the deflection aperture 13'''' of the projection unit 10'''', the sub-deflection apertures 131''''' and 132''''' replace the deflection aperture 13''''' of the projection unit 10'''''. Among them, sub-deflection apertures 131, 131', 131", 131''', 131'''', 131''''' only allow "•" light to be deflected through, and block "-" light; sub-deflection apertures 132, 132', 132", 132''', 132'''', 132''''' only allow "-" light to be deflected through, and block "•" light. Correspondingly, the pixels of a display panel are divided into two groups, which emit "-" light or "•" light respectively. For example, the odd-numbered columns pixels of each display panel come into a group of emitting "-" light; the other even-numbered columns pixels form the other group of emitting "•" light. Thus, two images can be projected simultaneously by two equivalent display screens in a projection module. In this case, a pixel of a display panel 11 corresponds to one of the two sub-deflection apertures of the corresponding projection unit 10. The sub-deflection apertures from different projection units can also be arranged interlacedly, exampled as FIG. 13. In the display module, crosstalk between different sub-deflection apertures may appear. For example, in FIG. 13, "•" light from display panel 11 will become crosstalk when it reaches to non-corresponding sub-deflection aperture 131'. In order to get better display effect, through modulating the corresponding converging device, the light from a display panel should avoid non-corresponding sub-deflection apertures with same orthogonal characteristics, or the existing crosstalk should be designed to avoid the observing zones. For example, in FIG. 13, "ψ" light from display panel 11 needs to avoid the sub-deflection aperture 131', or doesn't enter into the observing zones. This requirement remains valid for all this patent, and it is no longer always emphasized in the following segments.

In the cases shown in FIGS. 11 and 12, a projection module 100 projects more than one images by the more than one equivalent display screen. These images correspond to different sub-deflection apertures. The observing zones of these different images may overlap around the viewer's eye 50, or be mutually misplaced.

Figure 14:
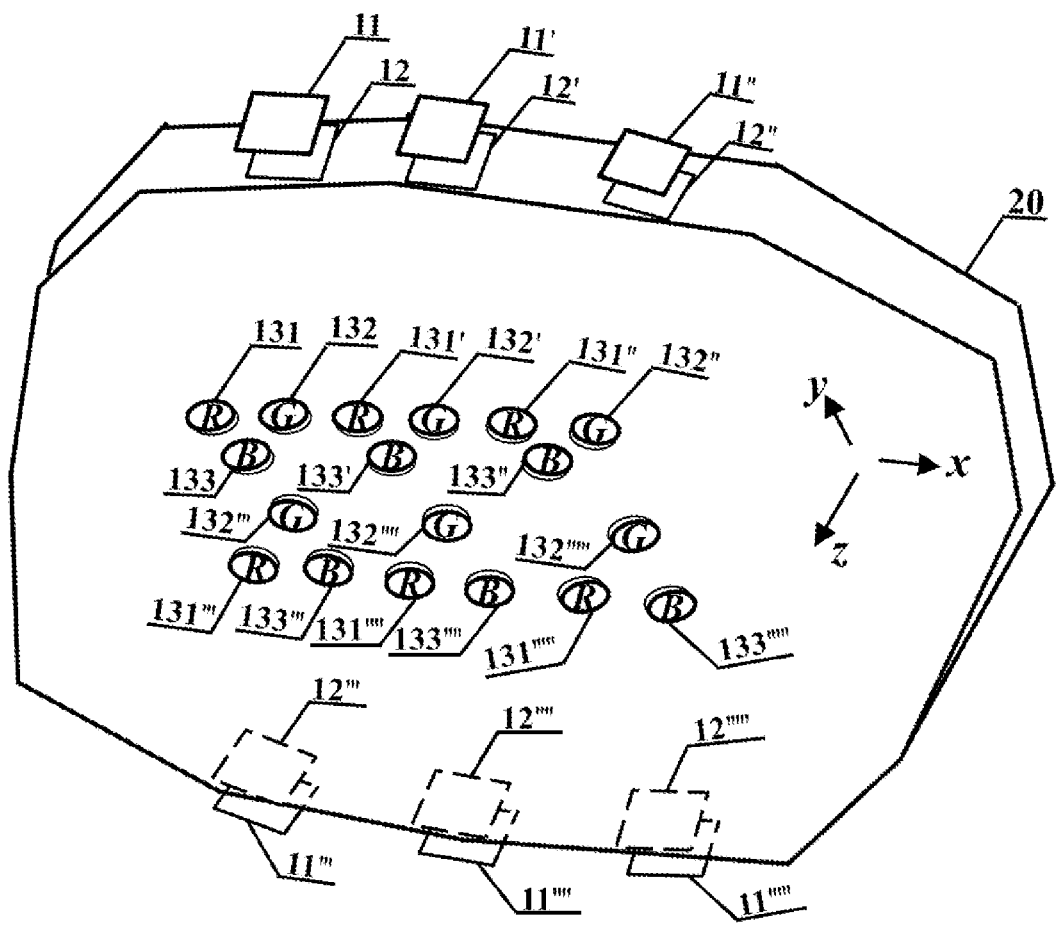
FIG. 14 is a projection module with sub-deflection apertures of color characteristics.

Colors can also be taken as the orthogonal characteristics, as shown in FIG. 14. The RGB display panels are used as the display panels, with each pixel being composed of 3 sub-pixels which emit red (R), green (G), and blue (B) light, respectively. A deflection aperture 13 of a projection unit 10 is replaced by three sub-deflection apertures which allow red only, or green only, or blue only light to be deflected through respectively. An example is shown in FIG. 14, such as the sub-deflection apertures 131, 132 and 133 of the projection unit 10, the sub-deflection apertures 131', 132' and 133' of the projection unit 10', the sub-deflection apertures 131", 132" and 133" of the projection unit 10", the sub-deflection apertures 131''', 132''' and 133''' of the projection unit 10''', the sub-deflection apertures 131'''', 132'''' and 133'''' of the projection unit 10'''', the sub-deflection apertures 131''''', 132''''' and 133''''' of the projection unit 10'''''. Among them, the sub-deflection apertures 131, 131', 131", 131''', 131'''', 131''''' only allow red light to be deflected through, and block green and blue light; the sub-deflection apertures 132, 132', 132", 132''', 132'''', 132''''' only allow green light to be deflected through, and block blue and red light; the sub-deflection apertures 133, 133', 133", 133''', 133'''', 133''''' only allow blue light to be deflected through, and block red and green light. Allowing light of R only, or G only, or B only to be deflected through and blocking light of other colors can be implemented by attaching a corresponding color filter to each sub-deflection aperture. In a projection unit, all sub-pixels emitting R light constitute a sub-pixel group, which is named as R sub-pixel group. Similarly, G sub-pixel group and B sub-pixel group are defined on a display panel. Thus, a sub-pixel group of a projection unit projects light through the corresponding sub-projection apertures. For example, the light from R sub-pixel group of the display panel 11 only can be deflected through by the sub-deflection aperture 131, the light from G sub-pixel group of the display panel 11 only can be deflected through by the sub-deflection aperture 132, and the light from B sub-pixel group of the display panel 11 only can be deflected through by the sub-deflection aperture 133. Thus, in a projection module, three equivalent display screens can simultaneously project three different images of different colors. In this case, a sub-pixel corresponds to only one sub-deflection aperture. The loading information of a sub-pixel is the projection message of the corresponding primary color of the 3D scene to be displayed along the line connecting the corresponding sub-deflection aperture with this sub-pixel's image on the corresponding converging device 12 and the sub-deflection aperture. In order to display a colored 3D scene, at least three images of different colors are needed to be perceived by an eye 50.

Figure 15:
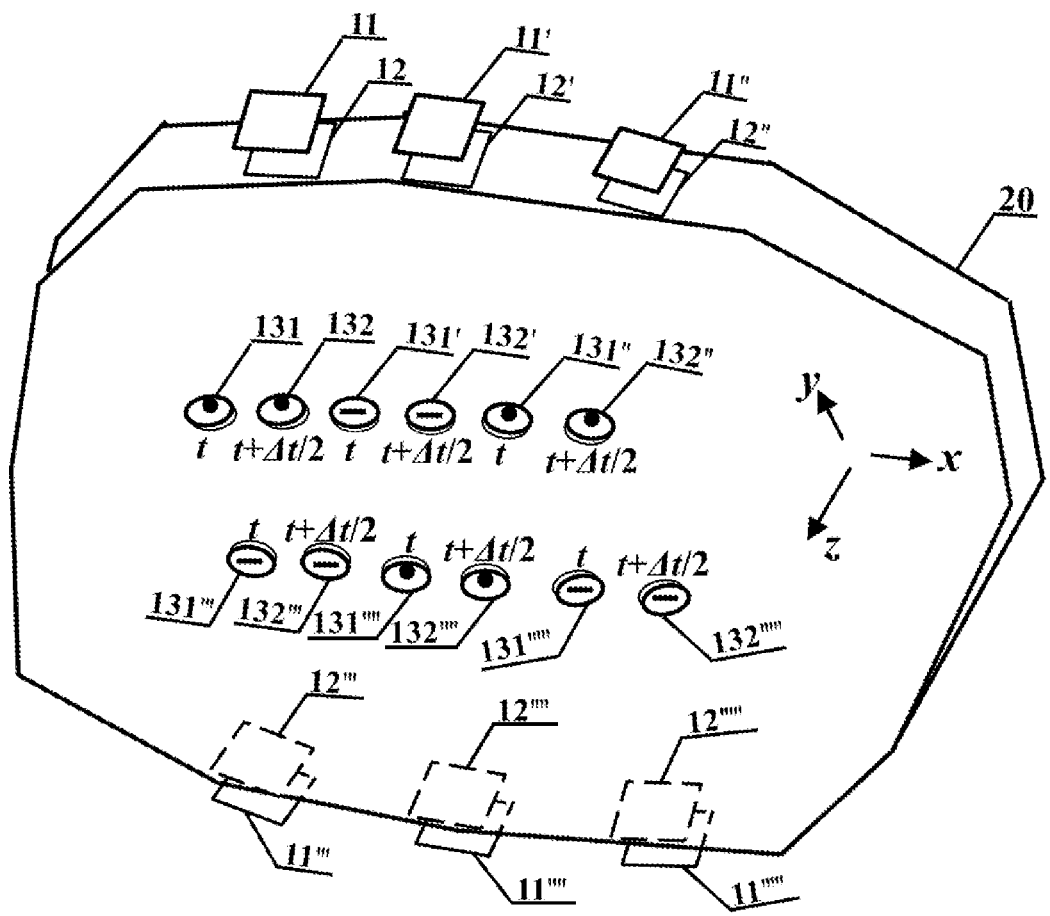
FIG. 15 is a projection module with sub-deflection apertures of mixed characteristics.

Different kinds of orthogonal characteristics also can be applied jointly. FIG. 15 shows an example of mixed characteristics that both timing characteristics and linear-polarization characteristics are endowed to the sub-deflection apertures. Concretely, at a time-point t of a time period t~t+Δt, the sub-deflection apertures 131, 131", 131'''' allow only incident "•" light to be deflected through, with corresponding display panels 11, 11", and 11'''' project only "•" light, and the turned-on sub-deflection apertures 131', 131''', 131''''' allow only incident "-" light to be deflected through, with corresponding display panels 11', 11''', 11''''' project only "-" light. Other sub-deflection apertures block incident light at this time-point, for example other sub-deflection apertures are turned off at this time-point. At the time-point t+Δt/2 of this time period t~t+Δt, the sub-deflection apertures 132, 132", 132'''' allow only "•" light to be deflected through, the sub-deflection apertures 132', 132''', 132''''' allow only "-" light to be deflected through. Other sub-deflection apertures block incident light at this time-point, for example other sub-deflection apertures are turned off at this time-point.

Figure 16:
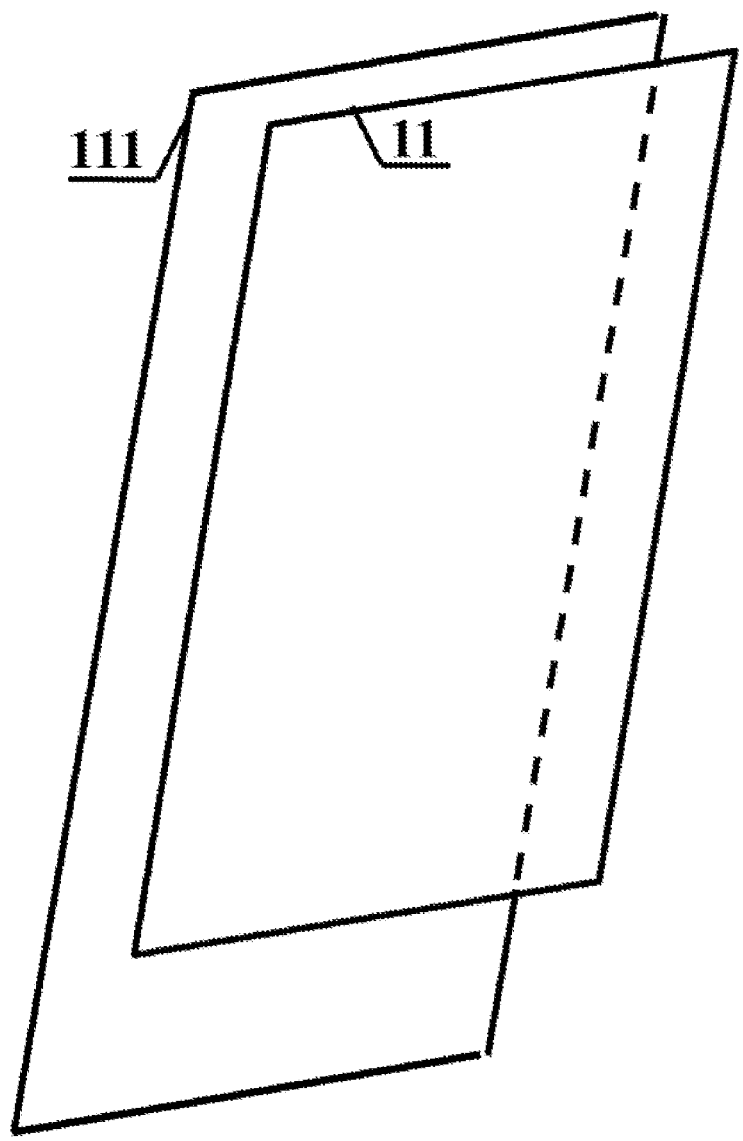
FIG. 16 is a back-lit display panel with a backlight module.
Figure 17:
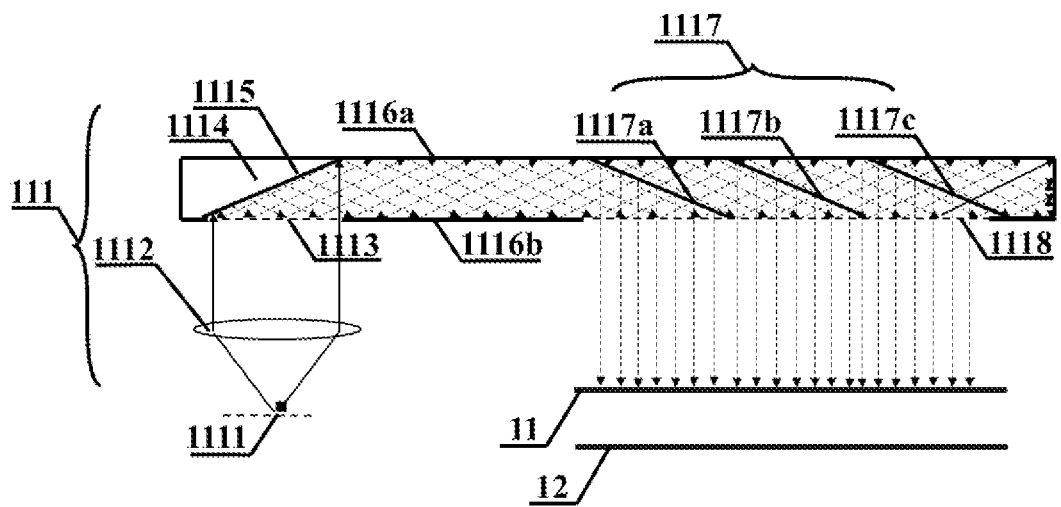
FIG. 17 shows the schematic drawing of an optical-waveguide backlight module.
Figure 18:
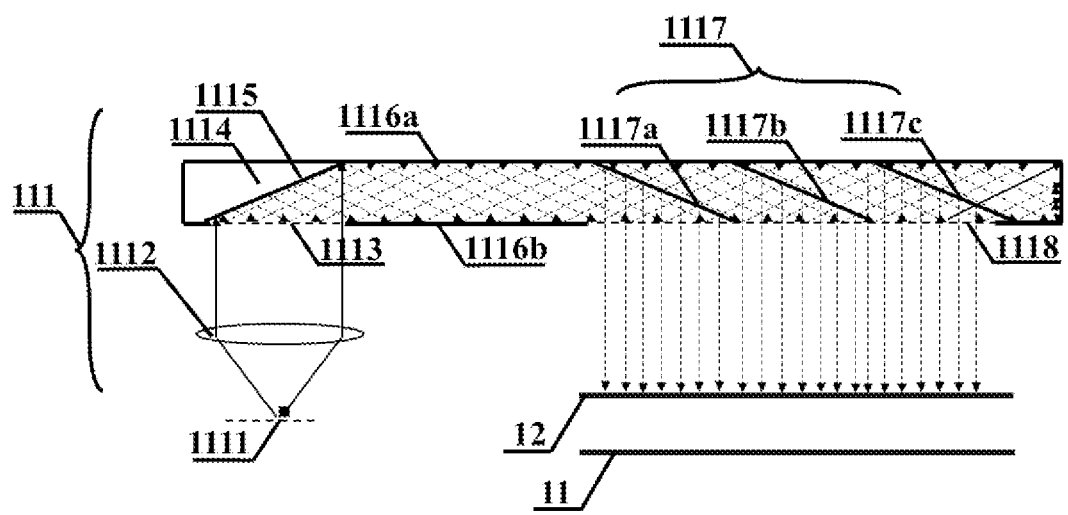
FIG. 18 shows another schematic drawing of an optical-waveguide backlight module.

In above embodiments, the shown display panels are self-luminous. A display panel 11 may also be a back-lit display panel, with backlight provided by a backlight module 111 shown in FIG. 16. In above figures, the display panel 11 of a projection unit 10 may be replaced by a back-lit display panel, with a backlight module 111 being placed corresponding to the display panel 11, as shown in FIG. 16. Under this condition, in a projection unit 10, the converging device 12 also can be placed between the backlight module 111 and the display panel 11 to modulate the incident light of the display panel 11, thus guiding light beam from a pixel or sub-pixel to the corresponding deflection aperture or sub-deflection aperture. The backlight from a backlight module 111 can be parallel light, or convergent light, or divergent light. For example, taking an optical waveguide structure as the backlight module 111, FIG. 17 shows a parallel backlight projected by this kind of optical-waveguide backlight module 111. An optical-waveguide backlight module 111 includes a light source 1111, a collimating element 1112, an entrance pupil 1113, a waveguide body 1114, a coupling-in element 1115, reflecting surfaces 1116a and 1116b, a coupling-out element 1117, and an exit pupil 1118. Light emitted from the light source 1111 is collimated by the collimating element 1112, and reaches to the coupling-in element 1115 through the entrance pupil 1113. The coupling-in element 1115 guides the incident light to propagate along the waveguide body 1114, through the reflecting of the reflecting surfaces 1116a and 1116b. The coupling-out device 1117 modulates the light from the waveguide body 1114, and guides it to exit through the exit pupil 1118. Among them, the coupling-out element 1117 shown in FIG. 17 takes an ensemble of two semitransparent surfaces 1117a, 1117b, and a reflecting surface 1117c as an example, for extension of the exit pupil 118. In the projection unit 10 with backlight module 111, the positional relationship between the display panel 11 and the converging device 12 can be adjusted as needed. As shown in FIG. 18, the converging device 12 modulates the incident light of the display panel 11, and guides it to converge to the corresponding deflection apertures or sub-deflection apertures. In the case shown in FIG. 18, the converging device 12 has no imaging function.

Figure 19:
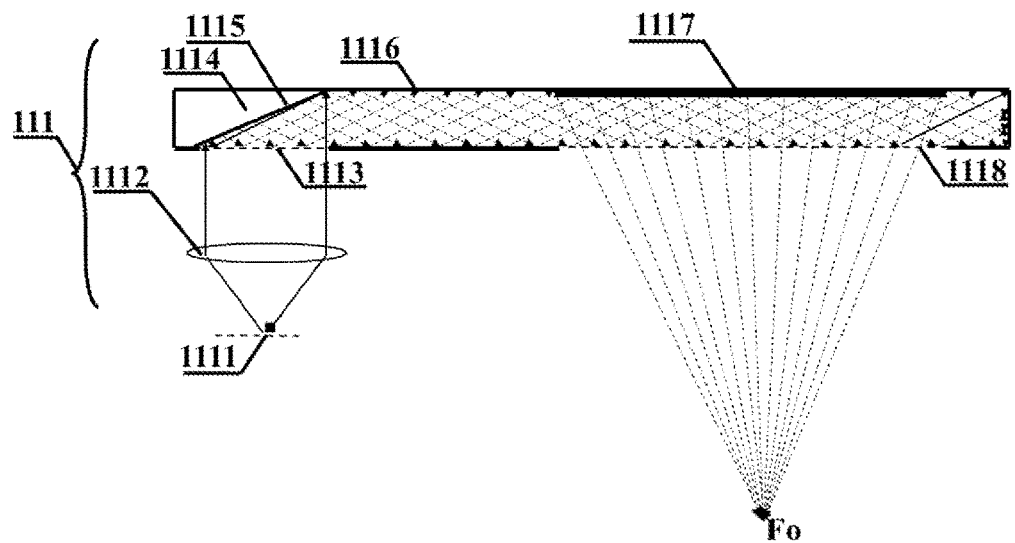
FIG. 19 shows convergent backlight from an optical-waveguide backlight module.

FIG. 19 shows an example that an optical-waveguide backlight module 111 provides a backlight converging to a point $F_o$. In FIG. 19, the coupling-out element 1117 is a holographic element, or a grating element. The optical-waveguide backlight module 111 shown in FIG. 17 or FIG. 19 is with common optical waveguide structures, which can also be other kinds of optical waveguide structures.

Figure 20A:
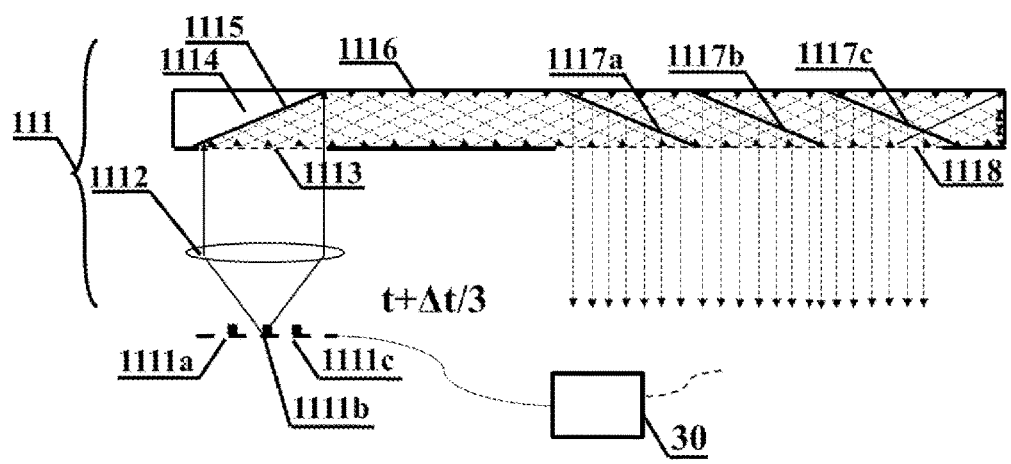
FIG. 20A and FIG. 20B show the parallel backlights exiting from an optical-waveguide backlight module along different directions.
Figure 20B:
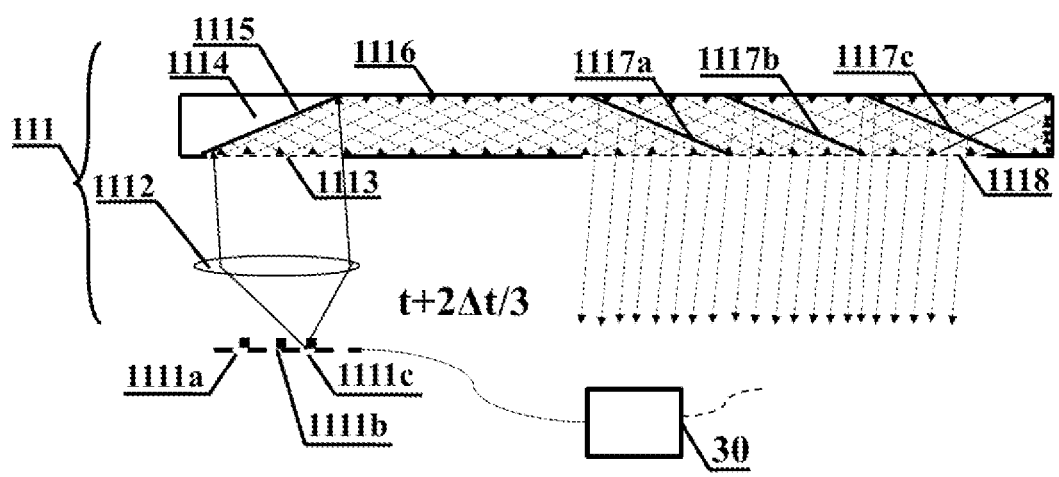

The backlight module 111 also can project a number of backlights, such as backlights with different propagating directions or converging to different points. In these cases, a deflection aperture needs to be replaced by sub-deflection apertures of a same number. Taking an optical-waveguide backlight module 111 as an example, the optical waveguide structure shown in FIG. 20A and FIG. 20B includes K=3 light sources 1111a, 1111b, and 1111c. Correspondingly, a deflection aperture 13 of a projection unit 10 is replaced by K=3 sub-deflection apertures. With K=3 light sources being activated by the control unit 30 sequentially at three time-points of a time period, K=3 backlights will be projected along different directions in a time period. Three backlights are designed to converge to the K=3 sub-deflection apertures sequentially, thus timing characteristics get endowed to the sub-deflection apertures. FIGS. 20A and 20B show two parallel backlights projected by the optical-waveguide backlight module 111 at time-points t+Δt/3 and t+2Δt/3 of a time period t~t+Δt, respectively. Correspondingly, only the light source 1111b is turned on in FIG. 20A, and only the light source 1111c is turned on in FIG. 20B. The optical-waveguide backlight module 111 also can project backlights which converge to spatial zones. The sub-deflection apertures also can have signal connections with the control unit 30, so to let a sub-deflection aperture be controlled to turn on only at the corresponding time-point when its corresponding backlight is projected. Similarly, the sub-deflection apertures of a same projection unit 10 may also be endowed with color characteristics, with each only allowing light of a corresponding primary color to be deflected through, or the backlight of a primary color which is designed converging to the corresponding sub-deflection aperture to be deflected through. In this case, in a projection unit 10, sub-pixels of a same primary color come into a sub-pixel group of the corresponding color characteristic. The backlight model 111 of the projection unit 10 can project backlights of different primary colors sequentially, or synchronously. Furthermore, different kinds of orthogonal characteristics can be combined to endow to the sub-deflection apertures, for projecting more equivalent display screens by a projection unit or/and getting better crosstalk suppression.

Figure 21:
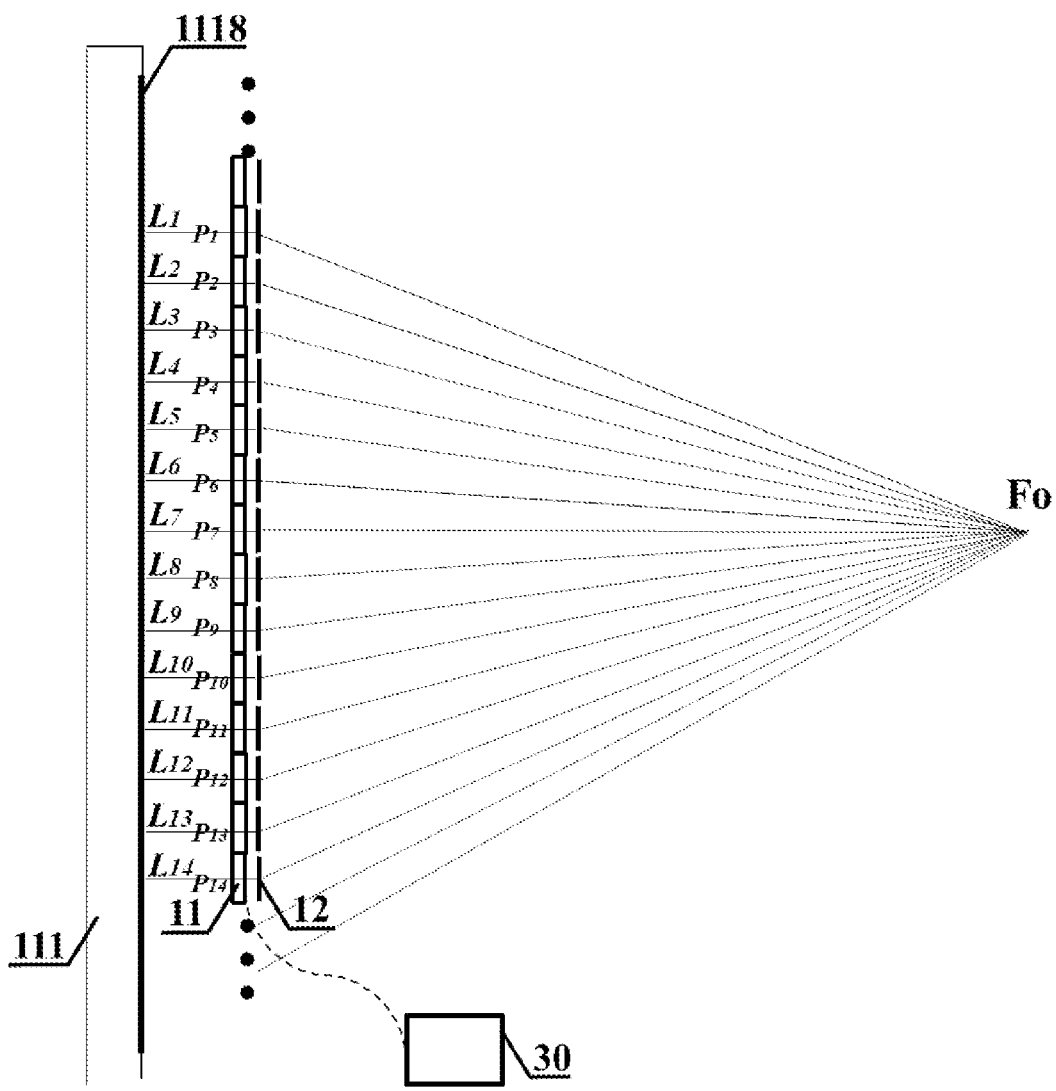
FIG. 21 shows the modulation of the parallel backlight by a microstructure-array converging device.
Figure 22:
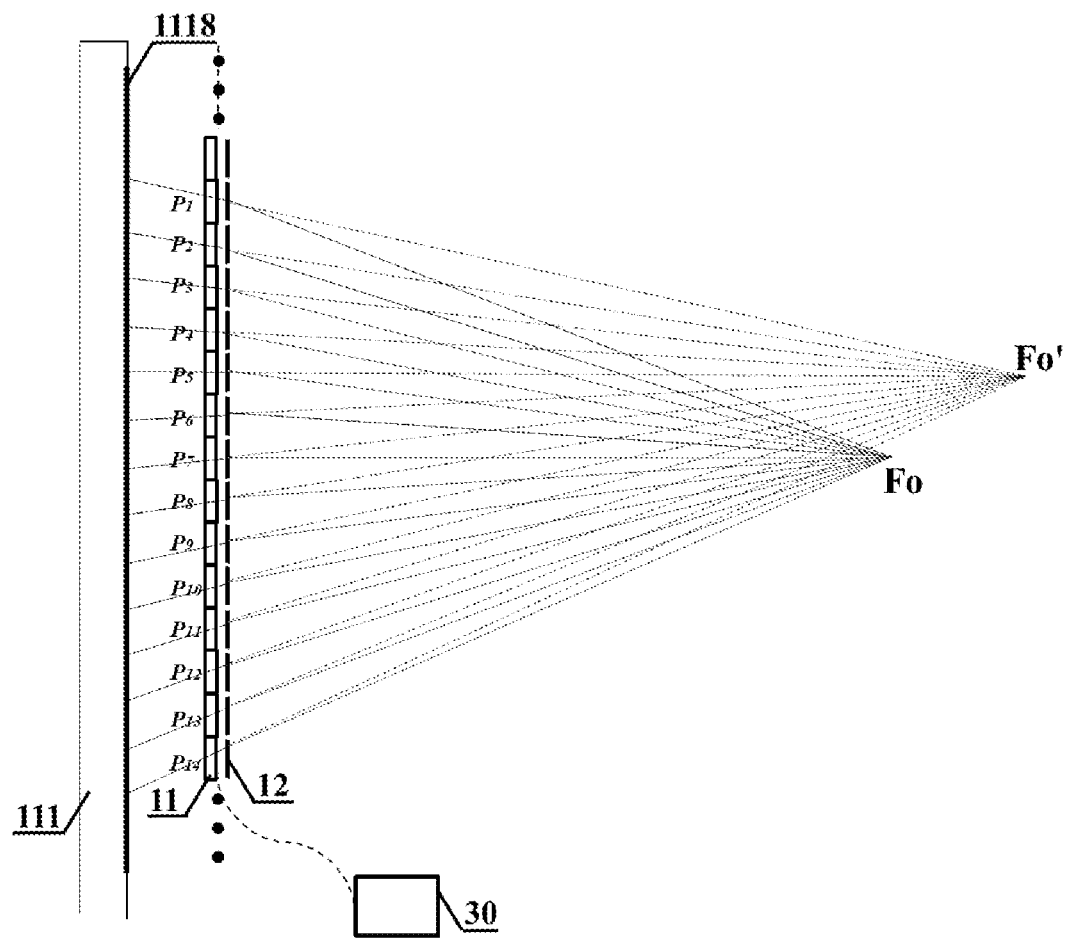
FIG. 22 shows the modulation of the convergent backlight by a microstructure-array converging device.

In above examples, a lens is taken as a converging device. The converging device can be other element, such as a microstructure array shown in FIG. 21. The microstructure elements of the microstructure array correspond to the pixels or sub-pixels of the corresponding display panel in a one-to-one manner, with each microstructure element guiding light beam incident onto or outgoing from the corresponding pixel or sub-pixel to the corresponding deflection aperture or sub-deflection aperture. FIG. 21 shows a situation that light beams from all pixels of a display panel 11 are converged to a point $F_o$ by the microstructure-type converging device 12. An optical-waveguide backlight module 111 is designed for providing backlight to the display panel 11. The display panel 11 is a back-lit display device. In FIG. 21, a parallel backlight is projected onto the display panel. The backlight can be non-parallel light, such as the backlight converging to point $F_o$, show in FIG. 22. The advantage of a microstructure-type converging device lies in that different pixel or sub-pixel groups of the display panel can be guided to different corresponding points or corresponding zones, which brings convenience on introducing of sub-deflection apertures. For example, a microstructure array is more preferably to function as the converging device 12 of the projection module 100 shown in FIG. 13, where the sub-deflection apertures from adjacent projection units are arranged interlacedly. A microstructure element can be a nano-grating structure, a holographic-grating structure, etc.

Figure 23A:
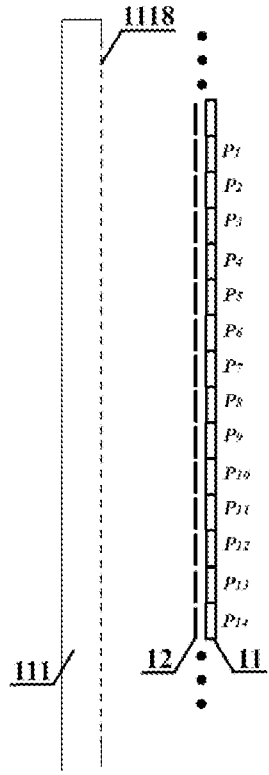
FIG. 23A, FIG. 23B, and FIG. 23C shows examples of position relationships between the converging device and the optical-waveguide backlight module.
Figure 23B:
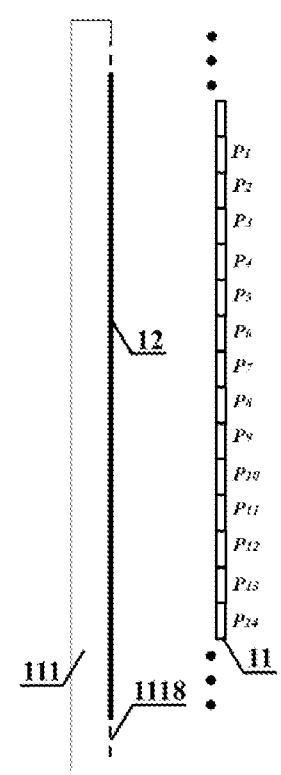
Figure 23C:
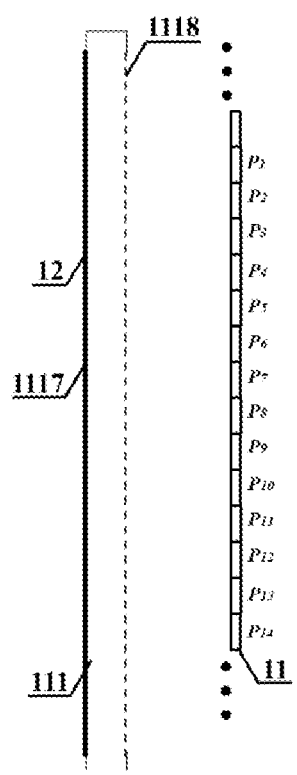

In a projection unit 10 with a microstructure-type converging device 12, the converging device 12 also can be placed between the backlight module 111 and the display panel 11. FIG. 23 takes a projection unit 10 with an optical-waveguide backlight module 111 as an example. In FIG. 23A, the microstructure-type converging device 12 is placed between the optical-waveguide backlight module 111 and the display panel 11, to modulate the light incident onto the display panel 11. The converging device 12 also can be integrated into the optical-waveguide backlight module 111. For example, in FIG. 23B, the converging device 12 is compounded into the exit pupil 1118 of the optical-waveguide backlight module 111. Or, the converging device 112 is compounded into the coupling-out element 1117 of the optical-waveguide backlight module 111, as shown in FIG. 23C. In FIGS. 21 to 23C, a microstructure element is set corresponding to a pixel. It also can be set corresponding to a sub-pixel.

Figure 24:
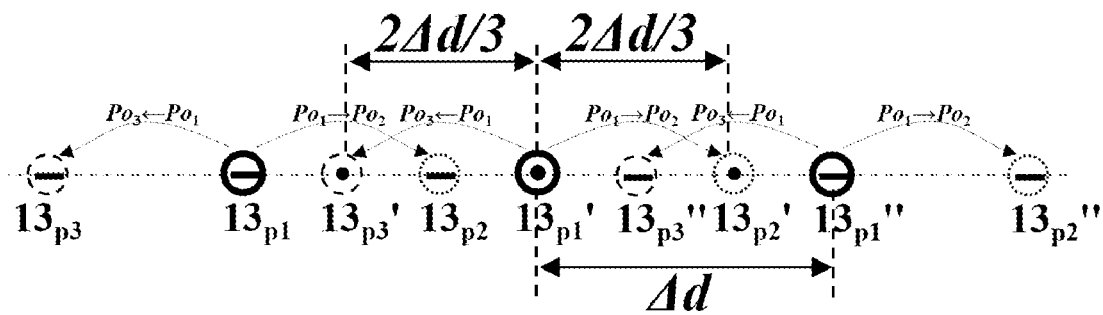
FIG. 24 shows an example arrangement of 3 groups of deflection apertures.

In order to provide a larger observing zone for the corresponding pupil by a display module, pupil-tracking unit 40 can be employed for positioning the pupil. Simultaneously, multiple groups of deflection apertures are designed in the display module. According to the pupil's position, only one group of them is activated as the effective deflection apertures with the remaining groups being passivated. The effective deflection apertures implement display as described in above embodiments, with at least a whole image always being perceived by the corresponding eye 50. The whole image projected by the display module is with a FOV being able to cover the 3D scene to be displayed. The activating or passivating of a deflection aperture can be implemented by attaching a switchable liquid crystal aperture onto it, which is turned on for activating or turned off for passivating by the control unit 30 with signal connection. Deflection apertures with even intervals in a group are the preferred arrangement. Under this premise, spatial overlapping between deflection apertures from different groups may appear. When the deflection apertures are endowed with orthogonal characteristics and the orthogonal characteristic of a deflection aperture cannot be switched between different states under the control of the control unit 30, the spatial overlapping between deflection apertures with different orthogonal characteristics should be avoided. Here, orthogonal characteristics whose different states cannot be endowed to a same deflection aperture in a switchable manner are defined as non-switchable orthogonal characteristics. switchable orthogonal characteristics are defined conversely. That is to say, the spatial overlapping between deflection apertures with non-switchable orthogonal characteristics must be avoided. To achieve this, a position arrangement strategy of the deflection apertures is needed. In FIG. 24, 3 groups of deflection apertures along one arrangement path, with each group consisting of 3 deflection apertures, are shown as an example. Deflection apertures $13_{p1}$, $13_{p1'}$, $13_{p1''}$ come into a group; deflection apertures $13_{p2}$, $13_{p2'}$, $13_{p2''}$ come into a group; deflection apertures $13_{p3}$, $13_{p3'}$, $13_{p3''}$ come into a group. $\Delta d$ is the interval between adjacent deflection apertures of a same group, and 2 kinds of linear-polarization characteristic of "•" and "-" are endowed to 2 adjacent deflection apertures of a group, respectively. With a polarizer being attached to a deflection aperture for implementing of "•" or "-" characteristic, "•" and "-" can be taken as non-switchable orthogonal characteristics. In a deflection-aperture group, a basic periodic structure unit along an arrangement path is determined according to the arrangement regular of the deflection apertures, under the premise that the switchable orthogonal characteristics are not considered. The deflection aperture number of a basic periodic structure unit is denoted by I here. In FIG. 24, two adjacent deflection apertures construct a basic periodic structure unit, with 1=2. Under the condition of H<GI, the optional offset distances $\Delta s$ between deflection-aperture groups along an arrangement path are set to be $\Delta=I_1 H\Delta d/(H+J)$. Here, H, G, J and $I_1$ all are positive integers, $I_1<(H+J)$ and J takes a positive integer which must make H/(H+J) be a reduced fraction, which means that the H and (H+J) only have a common factor 1. Under this condition, a maximum allowable group number (H+J−1) exist. When H=GI is taken, the maximum allowable group number is unlimited, with $\Delta=I_2 H\Delta d/(H+J)$. Here, $I_2$ is a positive integer of any value. Under this condition, when an enough number of groups with a relative offset distance $H\Delta d/(H+J)$ are designed, overlapping between deflection apertures with a same orthogonal characteristic from different groups will happen. In FIG. 24, I=2, G=1 and J=1 are taken as an example. If the partial overlapping between deflection apertures with different orthogonal characteristics from different groups must be avoided when an enough number of groups with a relative offset distance $H\Delta d/(H+J)$ are designed, the size of each deflection aperture along the arrangement path cannot be larger than $\Delta d/(H+J)$. To obtain a relatively large value of $\Delta d/(H+J)$, G=1 and J=1 are often preferred. Along the other arrangement path, the position arrangement strategy is also applicable. It is worthy to note that, for a display panel, the emitting light should be able to reach to all corresponding deflection apertures in different groups. When G=1 and I=1 are taken, H<GI becomes nonsignificant. Actually I=1 means the adopted orthogonal characteristics are switchable, which means different states of the adopted orthogonal characteristics can be endowed to a same deflection aperture in a switchable manner. Under this condition, the spatial conflict between deflection apertures from different groups is allowable. For example, when only timing characteristics are endowed to the deflection apertures, a deflection aperture can turn on at different time points of each time period. The timing characteristics of a deflection aperture can switch between different states.

When sub-deflection apertures are introduced in, above position arrangement strategy is also applicable, with $\Delta d$ denoting the interval between adjacent sub-deflection apertures of a same group along an arrangement path and I being the sub-deflection aperture number of a basic periodic structure unit of a sub-deflection-aperture group along the arrangement path. For example, in FIG. 15, the number of orthogonal characteristics of the sub-deflection apertures is I=4, along the arrangement path of sub-deflections 131, 132, 131',132', 131" and 132". In FIG. 11, along the arrangement path of sub-deflections 131, 132, 131',132', 131" and 132", I=1 and the spatial conflict between deflection apertures from different groups is allowable.

The method for a larger observing zone described above is exampled by reflection-type apertures in this patent. It is also applicable to transmission-type apertures, such as those apertures or strip-type apertures in the US patent THREE-DIMENSIONAL DISPLAY SYSTEM BASED ON DIVISION MULTIPLEXING OF THE VIEWER'S ENTRANCE-PUPIL AND DISPLAY (U.S. Ser. No. 10/652, 526B2), or the US patent application THREE-DIMENSIONAL DISPLAY BASED ON SPATIAL SUPERPOSITION OF SUB-PIXELS EMITTED BEAMS (US20210314553A1), or the pending patent THREE-DIMENSIONAL DISPLAY METHOD FOR LARGE FIELD OF VIEW AND SMALL VIEWING-ZONE INTERVAL (U.S. patent application Ser. No. 17/107,964).

Figure 25:
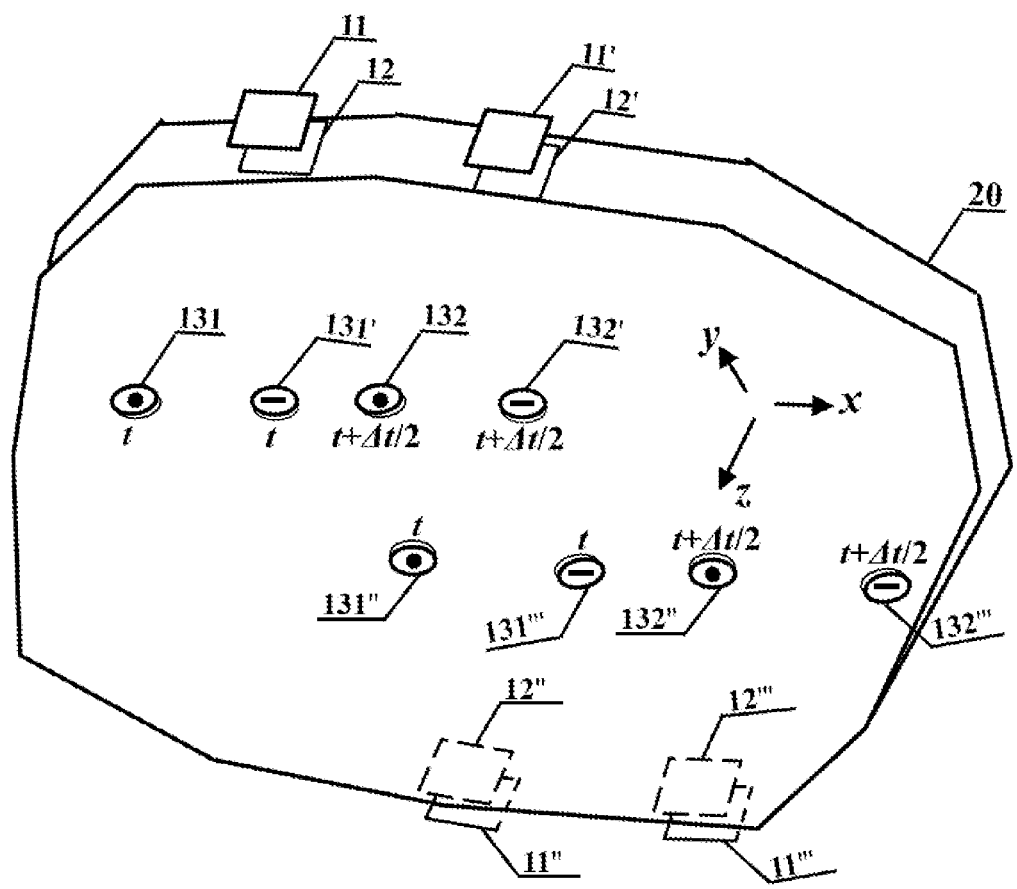
FIG. 25 shows a projection module with sub-deflection apertures interlacedly arranged.

In the position arrangement strategy discussed above, $\Delta d$ denotes the interval between adjacent deflection apertures or adjacent sub-deflection apertures of a same group. This corresponds to the situation that deflection-aperture groups or sub-deflection aperture groups take an equal deflection-aperture or sub-deflection-aperture interval along an arrangement path. There exists another case where the deflection apertures or the sub-deflection apertures of a same group are arranged by an unequal interval along an arrangement path, such as the sub-deflection aperture shown in FIG. 13. In the later case, a group can be taken as a combination of different sub-groups, and within each sub-group an equal deflection-aperture interval or an equal sub-deflection-aperture interval is taken. For example, in FIG. 13, sub-deflection apertures 131, 131', 131", 131''', 131'''', 131''''' come into a sub-group, the other sub-deflection apertures come into another sub-group. With $\Delta d$ denoting the deflection-aperture interval or the sub-deflection-aperture interval of a sub-group along an arrangement path, the optional offset distances $\Delta s$ between sub-groups from different groups along an arrangement path can also set to be $\Delta=I_1 H\Delta d/(H+J)$ at H<GI and $I_1<(H+J)$ or $\Delta=I_2 H\Delta d/(H+J)$ at H=GI, with I denoting the deflection aperture number or the sub-deflection aperture number of a basic periodic structure unit of a sub-group here. When the spatial conflict between sub-deflection apertures with different non-switchable orthogonal characteristics does not appear, for example in the case that only a very small number of groups or sub-groups are needed by the display module, the offset distance between sub-groups or groups can also take other values. When the sub-deflection apertures corresponding to different display panels are arranged interlaced, the crosstalk between different sub-deflection apertures should be avoided. FIG. 25 shows another example of mixed characteristics that both timing characteristics and linear-polarization characteristics are endowed to the sub-deflection apertures. Sub-deflection apertures 131 and 132 correspond to display panel 11; sub-deflection apertures 131' and 132' correspond to display panel 11'; sub-deflection apertures 131" and 132" correspond to display panel 11"; sub-deflection apertures 131'" and 132'" correspond to display panel 11'". Concretely, at a time-point t of a time period t~t+Δt, the sub-deflection apertures 131, 131" allow only incident "•" light to be deflected through, with corresponding display panels 11, 11" projecting only "•" light, and the turned-on sub-deflection apertures 131', 131'" allow only incident "-" light to be deflected through, with corresponding display panels 11', 11'" projecting only "-" light. The sub-deflection apertures 131, 131', 131", 131'" come into one sub-group. The Other sub-deflection apertures block incident light at this time-point, for example other sub-deflection apertures are turned off at this time-point. At the time-point t+Δt/2 of this time period t~t+Δt, the sub-deflection apertures 132, 132" allow only incident "•" light to be deflected through, the sub-deflection apertures 132', 132'" allow only incident "-" light to be deflected through. Other sub-deflection apertures block incident light at this time-point, for example other sub-deflection apertures are turned off at this time-point. The sub-deflection apertures 132, 132', 132", 132'" come into one sub-group. Spatially interlacing between sub-deflection apertures from adjacent projection units exists, such as the sub-deflection apertures 131 and 132'. When a whole image with its FOV covering the target 3D scene can be presented to the eye through the sub-deflection apertures of one sub-group, two or more sub-groups of sub-deflection apertures can provide a larger observing zone. If the observing zone generated by the sub-deflection-aperture sub-groups of a group is large enough, more groups will be not necessary. In the structure shown in FIG. 25, no crosstalk exists between interlaced sub-deflection. For example, due to light from display panels 11 and 11' being with different characteristics, no light beams from display panel 11 will be deflected through the sub-deflection aperture 131' as crosstalk. Similarly, no light beams from display panel 11' will be deflected through the sub-deflection aperture 132 as crosstalk. Due to different facing orientations of the sub-deflections, no light beams from display panel 11 will be deflected through the sub-deflection aperture 131" as crosstalk.

Obviously, the above-mentioned embodiments are merely examples to clearly illustrate the present invention, and are not intended to limit the implementation of the present invention. For those common technicians in the 3D display field, some changes or modifications in different forms can be made based on above description. It is not possible to exhaustively list all implementation methods. For example, other possible orthogonal characteristics also can be endowed to the deflection apertures or sub-deflection apertures of the present invention. The lens-type converging device also can be replaced by other lens groups, phase devices or phase device groups, etc. The materials of the eyeglass-shaped bracing structure 20 can be optical glass, or other materials. A deflection aperture or sub-deflection aperture itself also can have a phase modulation function, for modulating the divergence angle of each deflected-out light beam. The optical structure described in this patent also can combine with other optical structure described in other patents. In fact, any modification, equivalent replacement or improvement to the display scheme within the spirit and principle of the present invention, with the basic method being to restrict the divergence angle and propagating direction of the light beams from the display panel, combining with the mutually orthogonal characteristics between separated projection units, should be protected by the claims of the present invention.

What is claimed is:

1. A near-eye display module releasing eye's focus from a fixed plane, comprising:
   at least one projection module, which is constructed by a plurality of separated distributed projection units, wherein each of the projection units comprises a display panel, a converging device, and a deflection aperture in a mutual corresponding relationship;
   wherein, the display panel comprises a plurality of pixels for optical information display, the converging device converges a light incident onto or outgoing from the corresponding display panel, and the deflection aperture deflects the incident light from the corresponding converging device;
   a bracing structure, to hold the display panels, the converging devices and the deflection apertures of the at least one projection module;
   a control unit, which is with signal connection to the display panels and refreshes the display panels with optical information,
   wherein, a loading information of each pixel is the projection message of a 3D scene to be displayed, along a line connecting the corresponding deflection aperture with the pixel's image on the corresponding deflection aperture, or along a line connecting the corresponding deflection aperture with the pixel's image on the corresponding converging device and the corresponding deflection aperture;
   the near-eye display module is designed such that a bracing structure holding the deflection apertures is placed near to an eye of a viewer as an eyepiece, with a vertical projection of each of the deflection aperture on a plane perpendicular to an eye's viewing direction being less than 2.5 mm along all directions;
   and, all the display panels' images on the corresponding deflection aperture, or on the corresponding converging device and the corresponding deflection aperture, of a same projection module jointly cover a field of view of the 3D scene to be displayed, and at least a whole image with the field of view is projected into a pupil of the eye.

2. The near-eye display module releasing the eye's focus from the fixed plane according to claim 1, wherein the converging device of each of the projection unit is a lens, or a phase element with lens function.

3. The near-eye display module releasing the eye's focus from the fixed plane according to claim 1, wherein the converging device of a projection unit is a microstructure array, whose microstructure elements correspond to the pixels of the corresponding display panel by a one-to-one manner, with each of the microstructure element guiding a light beam incident onto or outgoing from the corresponding pixel to the deflection aperture of the projection unit.

4. The near-eye display module releasing the eye's focus from the fixed plane according to claim 1, wherein the display panels are back-lit display panels, and the projection unit comprises a backlight module for providing backlight.

5. The near-eye display module releasing the eye's focus from the fixed plane according to claim 4, wherein the backlight module of each of the projection unit is an optical waveguide structure.

6. The near-eye display module releasing the eye's focus from the fixed plane according to claim 4, wherein the deflection aperture of the projection unit is replaced by K sub-deflection apertures;

and, the backlight module of the projection unit projects K backlights sequentially at K time-points of a time period, with the K backlights converging to K sub-deflection apertures of the projection unit, respectively, through modulation of the converging device;

wherein, at a time-point, the corresponding sub-deflection aperture of each pixel is the sub-deflection aperture to which the light beam from the pixel converges at the time-point, and the loading information of each pixel is the projection message of the 3D scene to be displayed along a line connecting the corresponding sub-deflection aperture with the pixel's image on the corresponding sub-deflection aperture, or along the line connecting the corresponding sub-deflection aperture with the pixel's image on the corresponding sub-deflection aperture and the corresponding converging device; wherein K≥2.

7. The near-eye display module releasing the eye's focus from the fixed plane according to claim 6, wherein each sub-deflection aperture allows the incident light to be deflected through only at the time-points when the corresponding backlight is projected.

8. The near-eye display module releasing the eye's focus from the fixed plane according to claim 4, wherein each pixel of the display panel is composed of L sub-pixels which emit light of L different primary colors, respectively, and each deflection aperture is replaced by L sub-deflection apertures;

and, the backlight module of the projection unit projects L backlights of the L primary colors, with the L backlights being guided to the L sub-deflection apertures of the projection unit in a one-to-one manner;

wherein, the corresponding sub-deflection aperture of the sub-pixel is the sub-deflection aperture to which the light from the sub-pixel converges, and the loading information of the sub-pixel is the projection message with the corresponding primary color of the 3D scene to be displayed along the line connecting the corresponding sub-deflection aperture with the sub-pixel's image on corresponding sub-deflection aperture, or along the line connecting the corresponding sub-deflection aperture with the sub-pixel's image on the corresponding converging device and the corresponding deflection aperture; wherein L≥2.

9. The near-eye display module releasing the eye's focus from the fixed plane according to claim 8, wherein for each sub-deflection aperture, its emission ratio to light of a corresponding primary color is at least 9 times of that to light of non-corresponding primary colors.

10. The near-eye display module releasing the eye's focus from the fixed plane according to claim 1, wherein deflection apertures of adjacent projection units are respectively designed with different orthogonal characteristics, and for each deflection aperture, its emission ratio to light of a corresponding orthogonal characteristic from the corresponding display panel is at least 9 times of that to light of non-corresponding orthogonal characteristics.

11. The near-eye display module releasing the eye's focus from the fixed plane according to claim 10, wherein the orthogonal characteristics are timing characteristics which respectively allow the incident light to be deflected through at different time-points of a time period, or linear-polarization characteristics which respectively allow lights of mutual perpendicular polarization directions to be deflected through, or rotational-polarization characteristics which respectively allowing left-handed light or right-handed light to be deflected through, or a combination thereof.

12. The near-eye display module releasing the eye's focus from the fixed plane according to claim 11, wherein the control unit is with signal connection to the deflection apertures for controlling the deflection apertures to be turned on or turned off.

13. The near-eye display module releasing the eye's focus from the fixed plane according to claim 6, wherein the sub-deflection apertures corresponding to adjacent projection units are endowed with different orthogonal characteristics, and for each sub-deflection aperture, an emission ratio to light of a corresponding orthogonal characteristic from the corresponding display panel is at least 9 times of that to light of non-corresponding orthogonal characteristics.

14. The near-eye display module releasing the eye's focus from the fixed plane according to claim 13, wherein the control unit is with signal connection to the sub-deflection apertures for controlling the sub-deflection apertures to be turned on or turned off.

15. The near-eye display module releasing the eye's focus from the fixed plane according to claim 8, wherein the sub-deflection apertures corresponding to adjacent projection units are endowed with different orthogonal characteristics, and for each sub-deflection aperture, an emission ratio to light of a corresponding orthogonal characteristic is at least 9 times of that to light of non-corresponding orthogonal characteristics.

16. The near-eye display module releasing the eye's focus from a fixed plane according to claim 3, wherein a deflection aperture is replaced by N sub-deflection apertures, and the pixels or sub-pixels of a corresponding display panel are divided into N groups, which converge to the N sub-deflection apertures respectively through the converging device;

wherein, the loading information of each pixel or each sub-pixel is the projection message of the 3D scene to be displayed, along the line connecting the corresponding deflection aperture with the pixel's or the sub-pixel's image on the corresponding deflection aperture, or along the line connecting the corresponding deflection aperture with the pixel's or the sub-pixel's image on the corresponding converging device and the corresponding deflection aperture; wherein N≥2.

17. The near-eye display module releasing the eye's focus from the fixed plane according to claim 1, wherein a deflection aperture is replaced by N sub-deflection apertures of different orthogonal characteristics, with an emission ratio of a sub-deflection aperture to light of the corresponding orthogonal characteristic being at least 9 times of that to light of non-corresponding orthogonal characteristics, and the pixels or sub-pixels of a corresponding display panel are divided into N groups, which project light of the N kinds of orthogonal characteristics respectively;

wherein, the loading information of each pixel or each sub-pixel is the projection message of the 3D scene to be displayed, along the line connecting the corresponding deflection aperture with the pixel's or the sub-pixel's image on the corresponding deflection aperture, or along the line connecting the corresponding deflection aperture with the pixel's or the sub-pixel's image on the corresponding converging device and the corresponding deflection aperture wherein N≥2.

18. The near-eye display module releasing the eye's focus from the fixed plane according to claim 1, wherein the display panel-converging device pairs are discretely distributed around the bracing structure.

19. The near-eye display module releasing the eye's focus from the fixed plane according to claim 18, wherein the bracing structure is with an eyeglass appearance.

20. The near-eye display module releasing the eye's focus from the fixed plane according to claim 1, wherein multiple groups of deflection apertures are designed for the at least one projection module, and a pupil-tracking unit is employed for positioning the corresponding pupil;

wherein, one group of the deflection apertures are activated as an effective deflection apertures according to the pupil's position, with the remaining groups being passivated.

21. The near-eye display module releasing the eye's focus from the fixed plane according to claim 20, wherein when the deflection apertures are endowed with different orthogonal characteristics, the optional offset distances $\Delta s$ between different deflection-aperture groups along an arrangement path are set to be $\Delta = I_1 H \Delta d/(H+J)$ at $H<GI$ and $I_1<(H+J)$ or $\Delta = I_2 H \Delta d/(H+J)$ at $H=GI$, with $\Delta d$ denoting the interval between adjacent deflection apertures of a same group along the arrangement path;

wherein, H, G, $I_1$, and $I_2$ all are positive integers, J takes a positive integer which must make $H/(H+J)$ be a reduced fraction, and I is a deflection-aperture number of a basic periodic structure unit of a deflection-aperture group along the arrangement path, and a basic periodic structure unit is set according to the arrangement rule of the deflection apertures under the premise that only non-switchable orthogonal characteristics are considered, with non-switchable orthogonal characteristics being defined as the characteristics that different states cannot be endowed to a same deflection aperture in a switchable manner.

22. The near-eye display module releasing the eye's focus from the fixed plane according to claim 17, wherein multiple groups of sub-deflection apertures are designed for the at least one projection module, and a pupil-tracking unit is employed for positioning the corresponding pupil;

wherein, one group of the sub-deflection apertures are activated as the effective sub-deflection apertures according to the pupil's position, with the remaining groups being passivated.

23. The near-eye display module releasing the eye's focus from the fixed plane according to claim 22, wherein the optional offset distances $\Delta s$ between sub-deflection-aperture groups along an arrangement path are set to be $\Delta = I_1 H \Delta d/(H+J)$ at $H<GI$ and $I_1<(H+J)$ or $\Delta = I_2 H \Delta d/(H+J)$ at $H=GI$, with $\Delta d$ denoting the interval between adjacent sub-deflection apertures of a same group along this arrangement path;

wherein, H, G, $I_1$, and $I_2$ all are positive integers, J takes a positive integer which must make $H/(H+J)$ be a reduced fraction, and I is a sub-deflection-aperture number of a basic periodic structure unit of a sub-deflection-aperture group along the arrangement path, and a basic periodic structure unit is set according to the arrangement rule of the sub-deflection apertures under the premise that only non-switchable orthogonal characteristics are considered, with non-switchable orthogonal characteristics being defined as the characteristics that different states cannot be endowed to a same sub-deflection aperture in a switchable manner.

* * * * *